(12) United States Patent
Malyak et al.

(10) Patent No.: US 8,089,425 B2
(45) Date of Patent: Jan. 3, 2012

(54) OPTICAL DESIGNS FOR SCANNING BEAM DISPLAY SYSTEMS USING FLUORESCENT SCREENS

(75) Inventors: Phillip H. Malyak, Canton, MA (US); Gregory G. Cappiello, Windham, NH (US); James T. McCann, Marlow, NH (US); John Uebbing, Palo Alto, CA (US); John M. Watson, Haverhill, MA (US); Roger A. Hajjar, San Jose, CA (US)

(73) Assignee: Prysm, Inc., San Jose, CA (US)

( * ) Notice: Subject to any disclaimer, the term of this patent is extended or adjusted under 35 U.S.C. 154(b) by 1355 days.

(21) Appl. No.: 11/510,495

(22) Filed: Aug. 24, 2006

(65) Prior Publication Data

US 2007/0206258 A1 Sep. 6, 2007

Related U.S. Application Data

(60) Provisional application No. 60/779,261, filed on Mar. 3, 2006, provisional application No. 60/800,870, filed on May 15, 2006.

(30) Foreign Application Priority Data

Mar. 31, 2006 (WO) ................ PCT/US2006/011757

(51) Int. Cl.
*G09G 3/00* (2006.01)
(52) U.S. Cl. ...................... 345/32; 359/204.2
(58) Field of Classification Search .... 359/196.1–226.3; 345/29, 30, 32
See application file for complete search history.

(56) References Cited

U.S. PATENT DOCUMENTS

| | | | |
|---|---|---|---|
| 2,439,181 A | 5/1946 | Nicoll | |
| 3,025,161 A | 3/1962 | Thaddeus | |
| 3,556,637 A | 1/1971 | Palmquist | |
| 3,652,956 A | 3/1972 | Pinnow et al. | |
| 3,691,482 A | 9/1972 | Pinnow et al. | |
| 3,750,189 A | 7/1973 | Fleischer | |
| 3,868,167 A * | 2/1975 | Schreiber | 359/220.1 |
| 4,165,154 A | 8/1979 | Takahashi | |
| 4,166,233 A | 8/1979 | Stanley | |
| 4,295,093 A | 10/1981 | Middleton | |
| 4,305,646 A * | 12/1981 | Bechtold | 396/549 |

(Continued)

FOREIGN PATENT DOCUMENTS

DE 10044603 4/2001

(Continued)

OTHER PUBLICATIONS

Supplementary European Search Report dated Jul. 29, 2009 for European Patent Application No. 06836510.5 (6 pages).

(Continued)

*Primary Examiner* — Jennifer L. Doak
(74) *Attorney, Agent, or Firm* — Fish & Richardson P.C.

(57) ABSTRACT

Scanning beam display systems based on scanning light on a fluorescent screen. The screen can include fluorescent materials which emit visible light under excitation of the scanning light to form images with the emitted visible light. Multiple lasers can be used to simultaneously scan multiple laser beams to illuminate the screen for enhanced display brightness. For example, the multiple laser beams can illuminate one screen segment at a time and sequentially scan multiple screen segments to complete a full screen.

15 Claims, 15 Drawing Sheets

U.S. PATENT DOCUMENTS

| | | | |
|---|---|---|---|
| 4,307,320 A | 12/1981 | Kotera et al. | |
| 4,401,362 A | 8/1983 | Maeda | |
| 4,512,911 A | 4/1985 | Kotera et al. | |
| 4,613,201 A | 9/1986 | Shortle et al. | |
| 4,624,528 A | 11/1986 | Brueggemann | |
| 4,661,419 A | 4/1987 | Nakamura | |
| 4,707,093 A | 11/1987 | Testa | |
| 4,713,577 A | 12/1987 | Gualtieri et al. | |
| 4,737,840 A | 4/1988 | Morishita | |
| 4,799,050 A | 1/1989 | Prince et al. | |
| 4,808,804 A * | 2/1989 | Krichever et al. | 235/462.22 |
| 4,816,920 A | 3/1989 | Paulsen | |
| 4,872,750 A | 10/1989 | Morishita | |
| 4,897,715 A * | 1/1990 | Beamon, III | 348/115 |
| 4,923,262 A | 5/1990 | Clay | |
| 4,932,734 A | 6/1990 | Sakuma et al. | |
| 4,978,202 A | 12/1990 | Yang | |
| 4,979,030 A | 12/1990 | Murata | |
| 5,054,866 A | 10/1991 | Tomita et al. | |
| 5,080,467 A | 1/1992 | Kahn et al. | |
| 5,089,907 A | 2/1992 | Yoshikawa et al. | |
| 5,094,788 A | 3/1992 | Schrenk et al. | |
| 5,122,905 A | 6/1992 | Wheatley et al. | |
| 5,136,426 A | 8/1992 | Linden et al. | |
| 5,138,441 A | 8/1992 | Tanaka | |
| 5,140,604 A | 8/1992 | Alablanche et al. | |
| 5,146,355 A | 9/1992 | Prince et al. | |
| 5,166,944 A | 11/1992 | Conemac | |
| 5,170,181 A | 12/1992 | Tamada | |
| 5,175,637 A | 12/1992 | Jones et al. | |
| 5,182,659 A | 1/1993 | Clay et al. | |
| 5,198,679 A | 3/1993 | Katoh et al. | |
| 5,255,113 A | 10/1993 | Yoshikawa et al. | |
| 5,269,995 A | 12/1993 | Ramanathan et al. | |
| 5,270,842 A | 12/1993 | Clay et al. | |
| 5,296,922 A | 3/1994 | Mitani et al. | |
| 5,365,288 A | 11/1994 | Dewald et al. | |
| 5,389,324 A | 2/1995 | Lewis et al. | |
| 5,414,521 A | 5/1995 | Ansley | |
| 5,422,693 A | 6/1995 | Vogeley et al. | |
| 5,442,254 A | 8/1995 | Jaskie | |
| 5,473,396 A | 12/1995 | Okajima et al. | |
| 5,475,524 A | 12/1995 | Harris | |
| 5,477,285 A | 12/1995 | Riddle et al. | |
| 5,477,330 A | 12/1995 | Dorr | |
| 5,491,578 A | 2/1996 | Harris | |
| 5,521,986 A | 5/1996 | Curtin, II et al. | |
| 5,526,166 A | 6/1996 | Genovese | |
| 5,541,731 A | 7/1996 | Freedenberg et al. | |
| 5,550,667 A | 8/1996 | Krimmel | |
| 5,587,818 A | 12/1996 | Lee | |
| 5,594,556 A | 1/1997 | Vronsky et al. | |
| 5,598,292 A | 1/1997 | Yoshikawa et al. | |
| 5,602,445 A | 2/1997 | Solanki et al. | |
| 5,614,961 A | 3/1997 | Gibeau et al. | |
| 5,633,736 A | 5/1997 | Griffith et al. | |
| 5,646,766 A | 7/1997 | Conemac | |
| 5,648,181 A | 7/1997 | Watanabe | |
| 5,666,174 A | 9/1997 | Cupolo, III | |
| 5,668,662 A | 9/1997 | Magocs et al. | |
| 5,670,209 A | 9/1997 | Wyckoff | |
| 5,684,552 A | 11/1997 | Miyamoto et al. | |
| 5,698,857 A | 12/1997 | Lambert et al. | |
| 5,715,021 A | 2/1998 | Gibeau et al. | |
| 5,716,118 A | 2/1998 | Sato et al. | |
| 5,870,224 A | 2/1999 | Saitoh et al. | |
| 5,882,774 A | 3/1999 | Jonza et al. | |
| 5,907,312 A | 5/1999 | Sato et al. | |
| 5,920,361 A | 7/1999 | Gibeau et al. | |
| 5,959,296 A | 9/1999 | Cyr et al. | |
| 5,973,813 A | 10/1999 | Takeuchi | |
| 5,976,424 A | 11/1999 | Weber et al. | |
| 5,978,142 A | 11/1999 | Blackham et al. | |
| 5,994,722 A | 11/1999 | Averbeck et al. | |
| 5,998,918 A | 12/1999 | Do et al. | |
| 5,998,925 A | 12/1999 | Shimizu et al. | |
| 6,008,925 A | 12/1999 | Conemac | |
| 6,010,751 A | 1/2000 | Shaw et al. | |
| 6,057,953 A | 5/2000 | Ang | |
| 6,064,417 A | 5/2000 | Harrigan et al. | |
| 6,066,861 A | 5/2000 | Hohn et al. | |
| 6,069,599 A | 5/2000 | Py et al. | |
| 6,080,467 A | 6/2000 | Weber et al. | |
| 6,088,163 A | 7/2000 | Gilbert et al. | |
| 6,101,032 A | 8/2000 | Wortman et al. | |
| 6,117,530 A | 9/2000 | Jonza et al. | |
| 6,118,516 A | 9/2000 | Irie et al. | |
| 6,128,131 A | 10/2000 | Tang | |
| 6,134,050 A | 10/2000 | Conemac | |
| 6,154,259 A | 11/2000 | Hargis et al. | |
| 6,157,490 A | 12/2000 | Wheatley et al. | |
| 6,172,810 B1 | 1/2001 | Fleming et al. | |
| 6,175,440 B1 | 1/2001 | Conemac | |
| 6,219,168 B1 | 4/2001 | Wang | |
| 6,224,216 B1 | 5/2001 | Parker | |
| 6,226,126 B1 | 5/2001 | Conemac | |
| 6,236,160 B1 | 5/2001 | Komaki et al. | |
| 6,252,254 B1 | 6/2001 | Soules et al. | |
| 6,255,670 B1 | 7/2001 | Srivastava et al. | |
| 6,276,802 B1 | 8/2001 | Naito | |
| 6,288,817 B2 | 9/2001 | Rowe | |
| 6,292,285 B1 | 9/2001 | Wang et al. | |
| 6,329,966 B1 | 12/2001 | Someya et al. | |
| 6,333,724 B1 | 12/2001 | Taira et al. | |
| 6,417,019 B1 | 7/2002 | Mueller et al. | |
| 6,429,583 B1 | 8/2002 | Levinson et al. | |
| 6,429,584 B2 | 8/2002 | Kubota | |
| 6,463,585 B1 | 10/2002 | Hendricks et al. | |
| 6,531,230 B1 | 3/2003 | Weber et al. | |
| 6,576,156 B1 | 6/2003 | Ratna et al. | |
| 6,621,593 B1 | 9/2003 | Wang et al. | |
| 6,621,609 B1 | 9/2003 | Conemac | |
| 6,627,060 B1 | 9/2003 | Yum et al. | |
| 6,628,248 B2 | 9/2003 | Masumoto et al. | |
| 6,678,081 B2 | 1/2004 | Nishihata et al. | |
| 6,717,704 B2 | 4/2004 | Nakai | |
| 6,765,237 B1 | 7/2004 | Doxsee et al. | |
| 6,777,861 B2 | 8/2004 | Russ et al. | |
| 6,785,028 B1 * | 8/2004 | Atsuumi et al. | 359/207.11 |
| 6,809,347 B2 | 10/2004 | Tasch et al. | |
| 6,809,781 B2 | 10/2004 | Setlur et al. | |
| 6,839,042 B2 | 1/2005 | Conemac et al. | |
| 6,853,131 B2 | 2/2005 | Srivastava et al. | |
| 6,900,916 B2 | 5/2005 | Okazaki et al. | |
| 6,905,220 B2 | 6/2005 | Wortman et al. | |
| 6,937,221 B2 | 8/2005 | Lippert et al. | |
| 6,937,383 B2 | 8/2005 | Morikawa et al. | |
| 6,947,198 B2 | 9/2005 | Morikawa et al. | |
| 6,956,684 B2 * | 10/2005 | Orcutt | 359/199.1 |
| 6,986,581 B2 | 1/2006 | Sun et al. | |
| 6,987,610 B2 | 1/2006 | Piehl | |
| 7,068,406 B2 | 6/2006 | Shimomura | |
| 7,088,335 B2 | 8/2006 | Hunter et al. | |
| 7,090,355 B2 | 8/2006 | Liu et al. | |
| 7,147,802 B2 | 12/2006 | Sugimoto et al. | |
| 7,181,417 B1 | 2/2007 | Langseth et al. | |
| 7,206,041 B2 | 4/2007 | Kashima | |
| 7,213,923 B2 | 5/2007 | Liu et al. | |
| 7,230,767 B2 | 6/2007 | Walck et al. | |
| 7,239,436 B2 | 7/2007 | Orttinger et al. | |
| 7,283,301 B2 | 10/2007 | Peeters et al. | |
| 7,302,174 B2 | 11/2007 | Tan et al. | |
| 7,474,286 B2 | 1/2009 | Hajjar et al. | |
| 7,697,183 B2 | 4/2010 | Malyak et al. | |
| 7,728,845 B2 | 6/2010 | Holub | |
| 2001/0019240 A1 | 9/2001 | Takahashi | |
| 2001/0024086 A1 | 9/2001 | Fox et al. | |
| 2001/0050371 A1 | 12/2001 | Odaki et al. | |
| 2002/0003233 A1 | 1/2002 | Mueller-Mach et al. | |
| 2002/0008854 A1 | 1/2002 | Leigh Travis | |
| 2002/0024495 A1 | 2/2002 | Lippert et al. | |
| 2002/0050963 A1 | 5/2002 | Conemac et al. | |
| 2002/0122260 A1 | 9/2002 | Okazaki et al. | |
| 2002/0124250 A1 | 9/2002 | Proehl et al. | |
| 2002/0139945 A1 * | 10/2002 | Takahashi et al. | 250/584 |
| 2002/0145685 A1 | 10/2002 | Mueller-Mach et al. | |
| 2002/0163702 A1 | 11/2002 | Hori et al. | |

| | | | | | | |
|---|---|---|---|---|---|---|
| 2002/0185965 | A1 | 12/2002 | Collins et al. | JP | 2001-210122 | 8/2001 |
| 2003/0015692 | A1 | 1/2003 | Teng et al. | JP | 2001-316664 | 11/2001 |
| 2003/0094893 | A1 | 5/2003 | Ellens et al. | JP | 2002-83549 | 3/2002 |
| 2003/0184209 | A1 | 10/2003 | Russ et al. | JP | 2006-323391 | 11/2006 |
| 2003/0184531 | A1 | 10/2003 | Morikawa et al. | JP | 2008509067 A | 3/2008 |
| 2003/0184613 | A1 | 10/2003 | Nakamura et al. | KR | 10-2001-0097415 | 11/2001 |
| 2003/0184842 | A1 | 10/2003 | Morikawa et al. | KR | 2002-0024425 | 3/2002 |
| 2003/0231161 | A1 | 12/2003 | Yamaguchi | KR | 2003-0068589 | 8/2003 |
| 2004/0027465 | A1 | 2/2004 | Smith et al. | KR | 2004037267 A | 5/2004 |
| 2004/0070551 | A1 | 4/2004 | Walck et al. | WO | WO 90/12387 | 10/1990 |
| 2004/0136204 | A1 | 7/2004 | Asao | WO | WO 92/22109 | 12/1992 |
| 2004/0141220 | A1 | 7/2004 | Hama et al. | WO | WO 00/20912 | 4/2000 |
| 2004/0145312 | A1 | 7/2004 | Ouderkirk et al. | WO | WO 00/33389 | 6/2000 |
| 2004/0156079 | A1 | 8/2004 | Marshall et al. | WO | WO 01/24229 | 4/2001 |
| 2004/0160516 | A1 | 8/2004 | Ford | WO | WO 01/88609 | 11/2001 |
| 2004/0164927 | A1 | 8/2004 | Suyama et al. | WO | WO 02/11173 | 2/2002 |
| 2004/0165642 | A1 | 8/2004 | Lamont | WO | WO 02/23962 | 3/2002 |
| 2004/0184123 | A1 | 9/2004 | Morikawa et al. | WO | WO 02/29772 A2 | 4/2002 |
| 2004/0223100 | A1 | 11/2004 | Kotchick et al. | WO | WO 02/33970 | 4/2002 |
| 2004/0227465 | A1 | 11/2004 | Menkara et al. | WO | WO 02/057838 | 7/2002 |
| 2004/0263074 | A1 | 12/2004 | Baroky et al. | WO | WO 02/059693 A1 | 8/2002 |
| 2005/0001225 | A1 | 1/2005 | Yoshimura et al. | WO | WO 02/071148 | 9/2002 |
| 2005/0012446 | A1 | 1/2005 | Jermann et al. | WO | WO 2005/043232 A2 | 5/2005 |
| 2005/0023962 | A1 | 2/2005 | Menkara et al. | WO | WO 2005/119797 | 12/2005 |
| 2005/0023963 | A1 | 2/2005 | Menkara et al. | WO | WO 2006/097876 | 9/2006 |
| 2005/0051790 | A1 | 3/2005 | Ueda | WO | WO 2006/107720 | 10/2006 |
| 2005/0093818 | A1 | 5/2005 | Hatam-Tabrizi et al. | WO | WO 2006/107720 A1 | 10/2006 |
| 2005/0094266 | A1 | 5/2005 | Liu et al. | WO | WO 2007/050662 | 5/2007 |
| 2006/0050015 | A1 | 3/2006 | Kusunoki et al. | WO | WO 2007/095329 | 8/2007 |
| 2006/0066508 | A1 | 3/2006 | Walck et al. | WO | WO 2007/114918 | 10/2007 |
| 2006/0081793 | A1 | 4/2006 | Nestorovic et al. | WO | WO 2007/131195 | 11/2007 |
| 2006/0082873 | A1 | 4/2006 | Allen et al. | WO | WO 2007/134329 | 11/2007 |
| 2006/0088951 | A1 | 4/2006 | Hayashi et al. | WO | WO 2008/116123 | 9/2008 |
| 2006/0132021 | A1 | 6/2006 | Naberhuis et al. | WO | WO 2008/124707 | 10/2008 |
| 2006/0139580 | A1 | 6/2006 | Conner | WO | WO 2008/144673 | 11/2008 |
| 2006/0197922 | A1 | 9/2006 | Liu et al. | WO | WO 2009/003192 | 12/2008 |
| 2006/0221021 | A1 | 10/2006 | Hajjar et al. | | | |
| 2006/0221022 | A1 | 10/2006 | Hajjar | | | |
| 2006/0227087 | A1 | 10/2006 | Hajjar et al. | | | |
| 2006/0262243 | A1 | 11/2006 | Lester et al. | | | |
| 2006/0266958 | A1 | 11/2006 | Shimizu et al. | | | |
| 2006/0290898 | A1 | 12/2006 | Liu et al. | | | |
| 2007/0014318 | A1 | 1/2007 | Hajjar et al. | | | |
| 2007/0081239 | A1 | 4/2007 | May et al. | | | |
| 2007/0085977 | A1 | 4/2007 | Fricke et al. | | | |
| 2007/0183466 | A1 | 8/2007 | Son et al. | | | |
| 2007/0187580 | A1 | 8/2007 | Kykta et al. | | | |
| 2007/0187616 | A1 | 8/2007 | Burroughs et al. | | | |
| 2007/0188417 | A1 | 8/2007 | Hajjar et al. | | | |
| 2007/0228927 | A1 | 10/2007 | Kindler et al. | | | |
| 2007/0229946 | A1 | 10/2007 | Okada et al. | | | |
| 2008/0018558 | A1 | 1/2008 | Kykta et al. | | | |
| 2008/0066107 | A1 | 3/2008 | Moonka et al. | | | |
| 2008/0068295 | A1 | 3/2008 | Hajjar | | | |
| 2008/0235749 | A1 | 9/2008 | Jain et al. | | | |
| 2008/0247020 | A1 | 10/2008 | Malyak et al. | | | |
| 2008/0291140 | A1 | 11/2008 | Kent et al. | | | |
| 2009/0001272 | A1 | 1/2009 | Hajjar | | | |
| 2009/0021461 | A1 | 1/2009 | Hu et al. | | | |
| 2009/0116107 | A1 | 5/2009 | Kindler et al. | | | |
| 2009/0153582 | A1 | 6/2009 | Hajjar et al. | | | |
| 2009/0174632 | A1 | 7/2009 | Hajjar et al. | | | |
| 2010/0020377 | A1 | 1/2010 | Borchers | | | |
| 2010/0097678 | A1 | 4/2010 | Hajjar | | | |

FOREIGN PATENT DOCUMENTS

| | | |
|---|---|---|
| EP | 0196862 | 10/1986 |
| EP | 0271650 | 6/1988 |
| EP | 0618472 | 10/1994 |
| EP | 1150361 | 10/2001 |
| JP | 56164826 | 12/1981 |
| JP | 58-093147 | 6/1983 |
| JP | 59-155826 | 9/1984 |
| JP | 02-157790 | 6/1990 |
| JP | 2-199975 | 8/1990 |
| JP | 02 199975 A | 8/1990 |
| JP | 5232583 | 9/1993 |
| JP | 6-46461 | 2/1994 |
| JP | 2000-49380 | 2/2000 |

OTHER PUBLICATIONS

Supplementary European Search Report dated Mar. 25, 2009 for European Patent Application No. 06740108.3 (7 pages).
The Korean Intellectual Property Office, Office Action dated Mar. 31, 2009 for Korean Patent Application No. 10-2007-7025455 (4 pages).
English language translation of the Korean Intellectual Property Office, Office Action dated Mar. 31, 2009 for Korean Patent Application No. 10-2007-7025455 (5 pages).
International Search Report and Written Opinion dated Nov. 24, 2008 for PCT/US07/68989, now WO 2007/134329, published on Nov. 22, 2007 and entitled: "Multilayered Fluorescent Screens for Scanning Beam Display Systems" 9 pages.
International Search Report and Written Opinion dated Nov. 28, 2008 for PCT/US2008/064169, now WO 2008/144673, published on Nov. 27, 2007 and entitled: "Multilayered Screens with Light-Emitting Stripes for Scanning Beam Display Systems" 9 pages.
International Search Report and Written Opinion dated Nov. 26, 2008 for PCT/US2008/068679, now WO 2009/003192, published on Dec. 31, 2008 and entitled: "Servo Feedback Control Based on Designated Scanning Servo Beam in Scanning Beam Display Systems With Light-Emitting Screens" 11 pages.
"Fuji Film Color Mosaic Excellent for Image Sensor CM-EXIS," http://www.fujifilm-ffem.com/downloads/Product%20Spotlight%20Color%20Mosaic.pdf (1 page) [accessed May 27, 2008].
"Quantum Dots Explained," http://www.evidenttech.com/quantum-dots-explained.html (1 page) [accessed May 27, 2008].
"Reflection and retroreflection," Delta Technical Note—RS 101 http://www.delta.dk/C1256ED600446B80/sysOakFil/roadsensors%20techn%20info%20RS101/$File/RS101.pdf, revised: Jul. 10, 2004, 7 pages [accessed Oct. 23, 2008].
Collins et al., "Process Control of the Chlorobenzene Single-Step Liftoff Process with a Diazo-Type Resist," IBM J. Res. Develop. 26(5): 596-604 (Sep. 1982).
Cusano, D.A., "Cathodo-, Photo-, and D.C. -Electrolluminescence in Zinc Sulfide Layers," Luminescence of Organic and Inorganic Materials, Kallman, H.P. and G.M. Spruch (Eds.), New York University, pp. 494-522 (1962).

Daud, A. et al., "Transparent Y2O2S:Eu3+ phosphor thin films grown by reactive evaporation and their luminescent properties," Journal of the Society for Information Display (SID), vol. 4, No. 3, pp. 193-196 (1996).

Donofrio, R.L. and C.H. Rehkopf, "Screen Weight Optimization," Journal of the Electrochemical Society, vol. 126, No. 9, pp. 1563-1567 (Sep. 1979).

Greer, J.A. et al., "38.4: P-53 Thin Film Phosphors Prepared by Pulsed—Laser Deposition," 1994 SID International Symposium Digest of Technical Papers (SID '94 Digest) vol. XXV, pp. 827-830 (May 1994).

Hopkinson, R. G., "An Examination of Cathode-Ray-Tube Characteristics," The Journal of the Institute of Electrical Engineers, vol. 93, Part IIIa (Radiolocation), No. 5, pp. 779-794 (1946).

International Search Report and Written Opinion dated Aug. 29, 2008, for PCT/US2008/059603, filed Apr. 7, 2008, entitled: "Post-Objective Scanning Beam Systems".

International Search Report and Written Opinion dated Jul. 20, 2006 and International Preliminary Report on Patentability for dated Oct. 3, 2007 for PCT/US2006/11757, now WO 2006/107720, published on Oct. 12, 2006, entitled: "Display Systems and Devices Having Screens with Optical Fluorescent Materials".

International Search Report and Written Opinion dated Jun. 27, 2008 for PCT/US2008/057763, filed Mar. 20, 2008, entitled: "Delivering and Displaying Advertisement or Other Application Data to Display Systems".

International Search Report and Written Opinion dated Mar. 13, 2008 and International Preliminary Report on Patentability for dated Aug. 19, 2008 for PCT/US2007/004004, now WO 2007/095329, published on Aug. 23, 2007, entitled: "Servo-Assisted Scanning Beam Display Systems Using Fluorescent Screens".

International Search Report and Written Opinion dated May 28, 2008 for PCT/US06/41584, now WO 2007/050662, published on May 3, 2007, entitled: "Optical Designs for Scanning Beam Display Systems Using Fluorescent Screens," 9 pages.

Kalkhoran, N.M. et al., "LP-E: *Late News Poster*: Luminescence Study of Ion-Implanted ZnGa2O4 Thin Films on Flexible Organic Substrates," 1997 SID International Symposium Digest of Technical Papers (SID '97 Digest), vol. XXVIII, pp. 623-626 (May 1997).

Kim, J.M. et al. "6.3: Development of 4-in. Full Color FED, Devices," 1997 SID International Symposium Digest of Technical Papers ( SID '97 Digest), vol. XVIII, pp. 56-59 (May 1997).

Kramer, C.J., "Hologon deflectors for graphic arts applications: an overview," SPIE Proceedings on Beam Deflection and Scanning Technologies 1454: 68-100 (1991).

Kramer, C.J., "Hologon deflectors incorporating dispersive optical elements for scan line bow correction," SPIE Proceedings on Holographic Optics: Design and Applications, 883: 230-244 (1988).

Loewen, E.G. et al., "Grating efficiency theory as it applies to blazed and holographic gratings," Applied Optics, vol. 16, No. 10, p. 2711-2721 (Oct. 1977).

McDonald, L. W. and A. C. Lowe (Eds.), *Display Systems, Design Applications*, John Wiley & Sons: Chichester, England, pp. 195-196 (1997).

Mezner, L.Z. et al., "P-23: Centrifugal Settling of High Resolution 1-in CRT Screens," 1994 SID International Symposium Digest of Technical Papers (SID '94 Digest), vol. XXV, pp. 520-522 (May 1994).

Morikawa, M. et al., "511-3 Study to Improve the Flood-Beam CRT for Giant Screen Display," Proceedings of the Twelfth International Display Research Conference, Japan Display '92, Oct. 12-14, 1992, International Conference Center, Hiroshima, Japan pp. 385-388.

Mueller-Mach, R. et al., "High-Power Phosphor-Converted Light Emitting Diodes Based on III-Nitrides," IEEE Journal on Selected Topics in Quantum Electronics 8(2): 339-345 (Mar./Apr. 2002).

Nonogaki, S. et al., "Dry Process for Phosphor Screen Fabrication of Multicolored Cathode Ray Tubes," Research & Development in Japan, pp. 50-55 (1984).

Oki, K. and L. Ozawa, "A phosphor screen for high-resolution CRTs," Journal of the SID, vol. 3, No. 2, pp. 51-57 (Sep. 1995).

Pringsheim, P. and M. Vogel, *Luminescence of Liquids and Solids and its Practical Applications*, Interscience Publishers, Inc.: New York, N.Y., pp. 144-145 (1946).

Rowe, D.M., "Developments in holographic-based scanner designs," Proc. SPIE, Optical Scanning Systems: Design and Applications, Leo Beiser and Stephen F. Sagan, Eds. vol. 3131: 52-58 (1997).

Rynearson, R.L. et al., "Low-cost, mechanically rigid, high-aspect-ratio mirrors," SPIE Proceedings on Design, Fabrication, and Applications of Precision Plastic Optics 2600: 137-143 (1995).

Schermerhorn, J.D. et al., "15.5: A Grooved Structure for a Large High-Resolution Color ACPDP," 1997 SID International Symposium Digest of Technical Papers ( SID '97 Digest), vol. XVII, pp. 229-232 (May 1997).

Schlesinger et al., "Screening," Design, Development, and Fabrication of Ultra-High-Resolution Cathode Ray tube. Technical Report ECOM-00476, pp. 64-72, Feb. 1969.

Smith, D.C. et. al., "32.5: Late-News Paper: Crystalline-As-Deposited CaGa2S4:Ce via Low Temperature Metal Organic Chemical Vapor Deposition," 1995 SID International Symposium Digest of Technical Papers (SID '95 Digest), vol. XXVI, pp. 728-731 (May 1995).

Smith, W.J., "Scanner/f-0 and Laser Disk Collimator Lenses," Chapter 22 in Modern Lens Design: A Resource Manual, pp. 411-430, Boston, Mass.: McGraw-Hill, Inc., 1992.

Withnall et al., "Studies of UV stimulated luminesence from phosphors of commerical importance," Central Laser Facility Annual Report 2004/2005 http://www.clf.rl.ac.uk/Reports/2004-2005/pdf/64.pdf [accessed on Mary 23, 2008], 2 pages.

Yocom, P. N., "Future requirements of display phosphors from an historical perspective," Journal of the Society for Information Display (SID), Special Section: Papers from the First International Conference on the Science and Technology of Display Phosphors, vol. 4, No. 3, pp. 149-152 (Oct. 1996).

Yocom, P. N., "New green phosphors for plasma displays," Journal of the Society for Information Display (SID), Special Section: Papers from the First International Conference on the Science and Technology of Display Phosphors, vol. 4, No. 3, pp. 169-172 (Oct. 1996).

Županc-Mežnar, L. and M. Žumer, "26.4:Preparation of P43 Suspension and Screen-Quality Evaluation in 1—in. CRTs", 1997 SID International Symposium Digest of Technical Papers ( SID '97 Digest), vol. XVIII, pp. 440-443 (May 1997).

USPTO Final Office acton in U.S. Appl. No. 11/335,813, mailed Mar. 15, 2010 , 17 pages.

International Search Report and Written Opinion dated Jan. 28, 2010 for PCT/US2009/051878, now WO 2010/012003, 11 pages.

Extended European Search Report for Application No. EP 07783797, dated Dec. 10, 2009, 5 pages.

Supplementary European Search Report and Search Opinion for Application No. EP 07750816, dated Mar. 1, 2011, 10 pages.

Official Action for Application No. 2009146834, dated Apr. 12, 2011, 7 pages.

\* cited by examiner

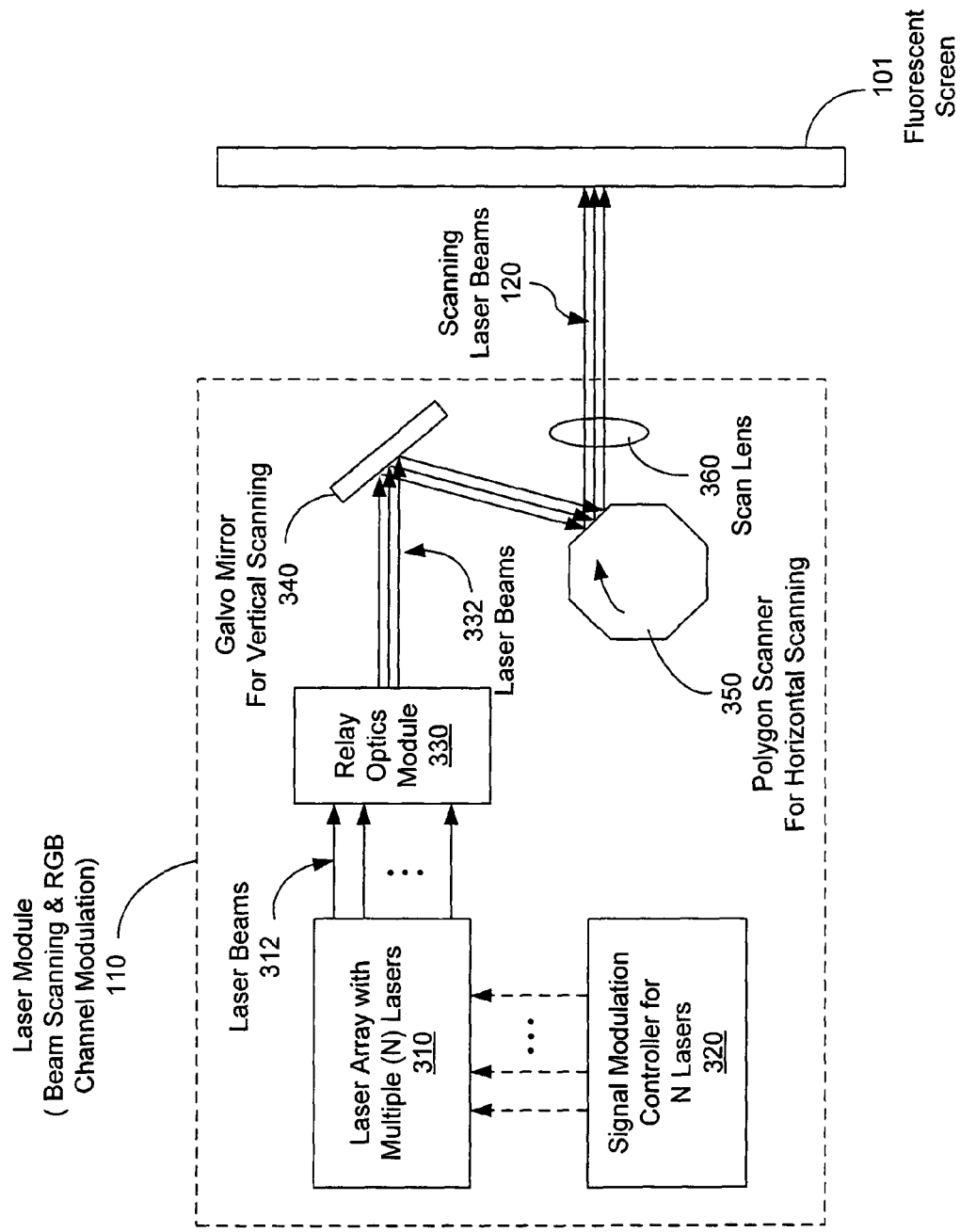

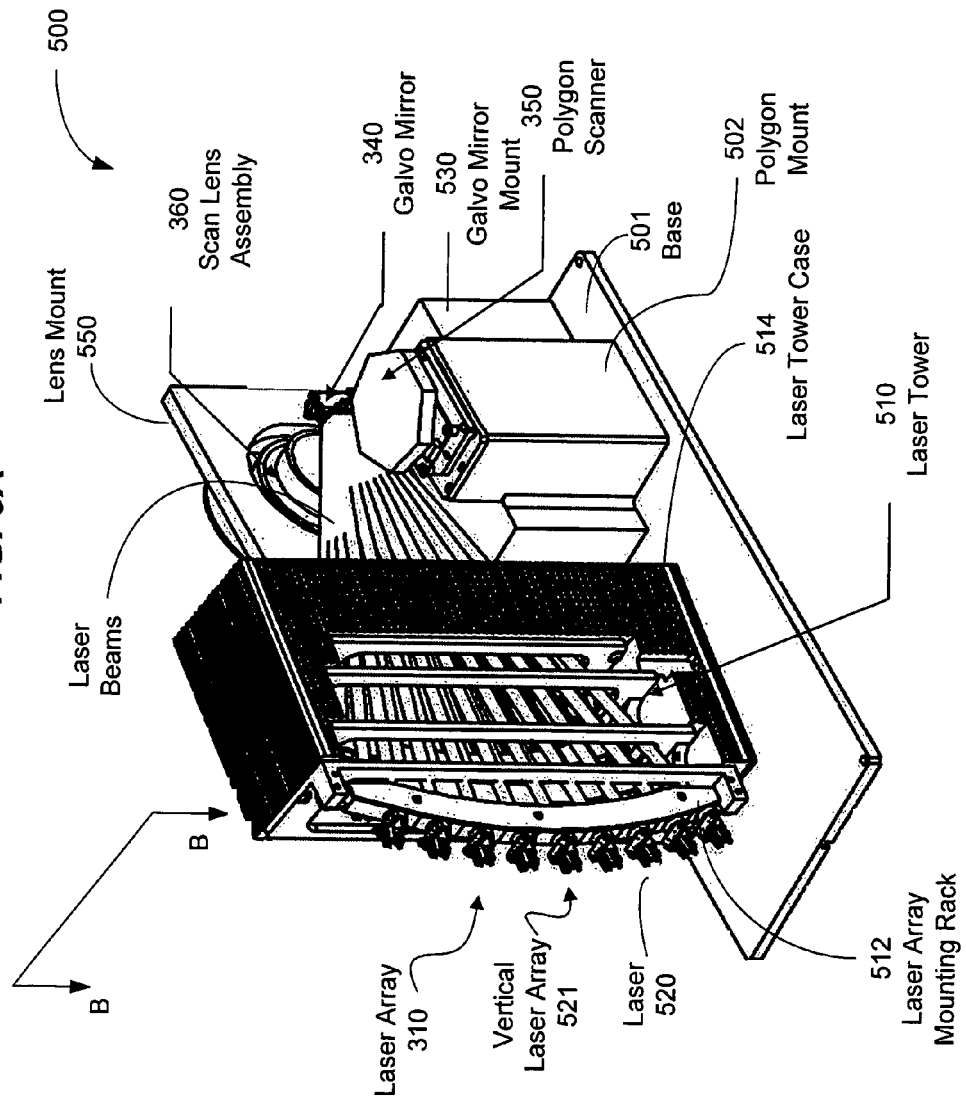

OPTICAL DESIGNS FOR SCANNING BEAM DISPLAY SYSTEMS USING FLUORESCENT SCREENS

This application claims the benefits of U.S. Provisional Patent Application Nos. 60/779,261 entitled "Display Systems Using Scanning Light and Electronic Correction of Optical Distortion By Imaging Lens Assembly" and filed on Mar. 3, 2006 and 60/800,870 entitled "Display Systems Using Fluorescent Screens Including Fluorescent Screens With Prismatic Layer" and filed on May 15, 2006.

This application claims the benefit of PCT patent application No. PCT/US2006/11757 entitled "Display Systems Having Screens With Optical Fluorescent Materials" and filed Mar. 31, 2006.

This application incorporates by reference the entire disclosures of the above three applications as part of the specification of this application.

BACKGROUND

This application relates to display systems that use screens with fluorescent materials to emit colored light under optical excitation, such as laser-based image and video displays and screen designs for such displays.

Many image and video displays are designed to directly produce color images in different colors, such as red, green and blue and then project the color images on a screen. Such systems are often referred to as "projection displays" where the screen is simply a surface to make the color images visible to a viewer. Such projection displays may use white light sources where white beams are filtered and modulated to produce images in red, green and blue colors. Alternatively, three light sources in red, green and blue may be used to directly produce three beams in red, green and blue colors and the three beams are modulated to produce images in red, green and blue. Examples of such projection displays include digital light processing (DLP) displays, liquid crystal on silicon (LCoS) displays, and grating light valve (GLV) displays. Notably, GLV displays use three grating light valves to modulate red, green and blue laser beams, respectively, and use a beam scanner to produce the color images on a screen. Another example of laser-based projection displays is described in U.S. Pat. No. 5,920,361 entitled "Methods and apparatus for image projection." Projection displays use optical lens systems to image and project the color images on the screen.

Some other image and video displays use a "direct" configuration where the screen itself includes light-producing color pixels to directly form color images in the screen. Such direct displays eliminate the optical lens systems for projecting the images and therefore can be made relatively smaller than projection displays with the same screen sizes. Examples of direct display systems include plasma displays, liquid crystal displays (LCDs), light-emitting-diode (LED) displays (e.g., organic LED displays), and field-emission displays (FEDs). Each color pixel in such direct displays includes three adjacent color pixels which produce light in red, green and blue, respectively, by either directly emit colored light as in LED displays and FEDs or by filtering white light such as the LCDs.

These and other displays are replacing cathode-ray tube (CRT) displays which dominated the display markets for decades since its inception. CRT displays use scanning electron beams in a vacuum tube to excite color phosphors in red, green and blue colors on the screen to emit colored light to produce color images. Although CRT displays can produce vivid colors and bright images with high resolutions, the use of cathode-ray tubes places severe technical limitations on the CRT displays and leads to dramatic decline in demand for CRT displays in recent years.

SUMMARY

The specification of this application describes, among others, scanning beam display systems based on scanning light on a fluorescent screen. The screen can include fluorescent materials which emit visible light under excitation of the scanning light to form images with the emitted visible light. Multiple lasers can be used to simultaneously scan multiple laser beams to illuminate the screen for enhanced display brightness. For example, the multiple laser beams can illuminate one screen segment at a time and sequentially scan multiple screen segments to complete a full screen.

For example, one scanning beam display system described in this specification can include lasers forming a laser array to produce a plurality of laser beams, respectively; a scanning module placed in an optical path of the laser beams to scan the laser beams in two orthogonal directions; and an afocal optical relay module placed between the lasers and the scanning module having a plurality of lenses to reduce a spacing between two adjacent laser beams of the laser beam and to overlap the laser beams at the scanning module. In one implementation of the afocal optical relay module, the optical relay module can include a first lens having a first focal length to receive and focus the laser beams from the lasers; a second lens having a second focal length shorter than the first focal length and spaced from the first lens by the first focal length to focus the laser beams from the first lens; and a third lens having a third focal length longer than the second focal length and spaced from the second lens by the third focal length to focus and direct the laser beams from the second lens to the scanning module. In one implementation of the scanning module, the scanning module can include a galvo mirror positioned to receive the laser beams from the third lens and scan the received laser beams along the first scanning direction, and a polygon scanner positioned to receive the laser beams from the galvo mirror and operable to scan the received laser beams along a second scanning direction orthogonal to the first scanning direction, where the system further includes an optical imaging lens module placed between the galvo mirror and the polygon scanner to image the galvo mirror onto the polygon scanner.

For another example, a display system can include lasers forming a laser array to produce a plurality of laser beams, respectively; a scanning module placed in an optical path of the laser beams to scan the laser beams in two orthogonal directions; a screen comprising fluorescent materials that emit visible light to form images with the emitted light when illuminated by the laser beams; a scan lens positioned to receive the laser beams from the scanning module and to project the laser beams onto the screen; and first and second optical reflectors that reflect the laser beams. The first optical reflector is positioned to reflect scanning laser beams from the scan lens to the second optical reflector which is positioned to reflect the scanning laser beams from the first optical reflector to the screen, and the first and second optical reflectors are positioned to fold an optical path from the scan lens to the screen to reduce a distance between the scan lens and the screen.

The specification of this application also describes an example method for scanning light onto a screen to display an image. This method includes modulating light to include optical pulses that carry images to be displayed; scanning the light in two orthogonal scanning directions; and using a scan lens to project the scanned light on a screen to show the images, where the light is modulated to carry distorted versions of the images to include image distortions that negate distortions caused by the scan lens when displayed on the screen. In one implementation of this method, the timing of the optical pulses in one scanning direction is controlled to negate a portion of distortions caused by the scan lens when displayed on the screen.

As a further example, a display system is described to include a light source to produce at least one excitation beam modulated to carry images; a scanning module to scan the excitation beam in two orthogonal directions; a fluorescent screen to receive the scanning excitation beam, the fluorescent screen emitting visible light to form the images with the emitted visible light when illuminated by the scanning excitation beam; and a two-dimensional f-theta scan lens positioned to receive the scanning excitation beam from the scanning module and to project the scanning excitation beam onto the screen. This system can also include a signal modulation controller in communication with the light source to supply image data for the images to control the light source which modulates the excitation beam. The signal modulation controller provides image data with image distortions which negate optical distortions of the two-dimensional f-theta scan lens when displayed on the screen.

These and other examples and implementations are described in detail in the drawings, the detailed description and the claims.

BRIEF DESCRIPTION OF THE DRAWINGS

FIG. 3 shows an example implementation of the laser module in FIG. 1 having multiple lasers that direct multiple laser beams on the screen.

FIGS. 5A and 5B show an example of a laser module with an array of lasers to produce different scanning beams onto the screen for implementations of the display system in FIG. 3.

DETAILED DESCRIPTION

Figure 1:
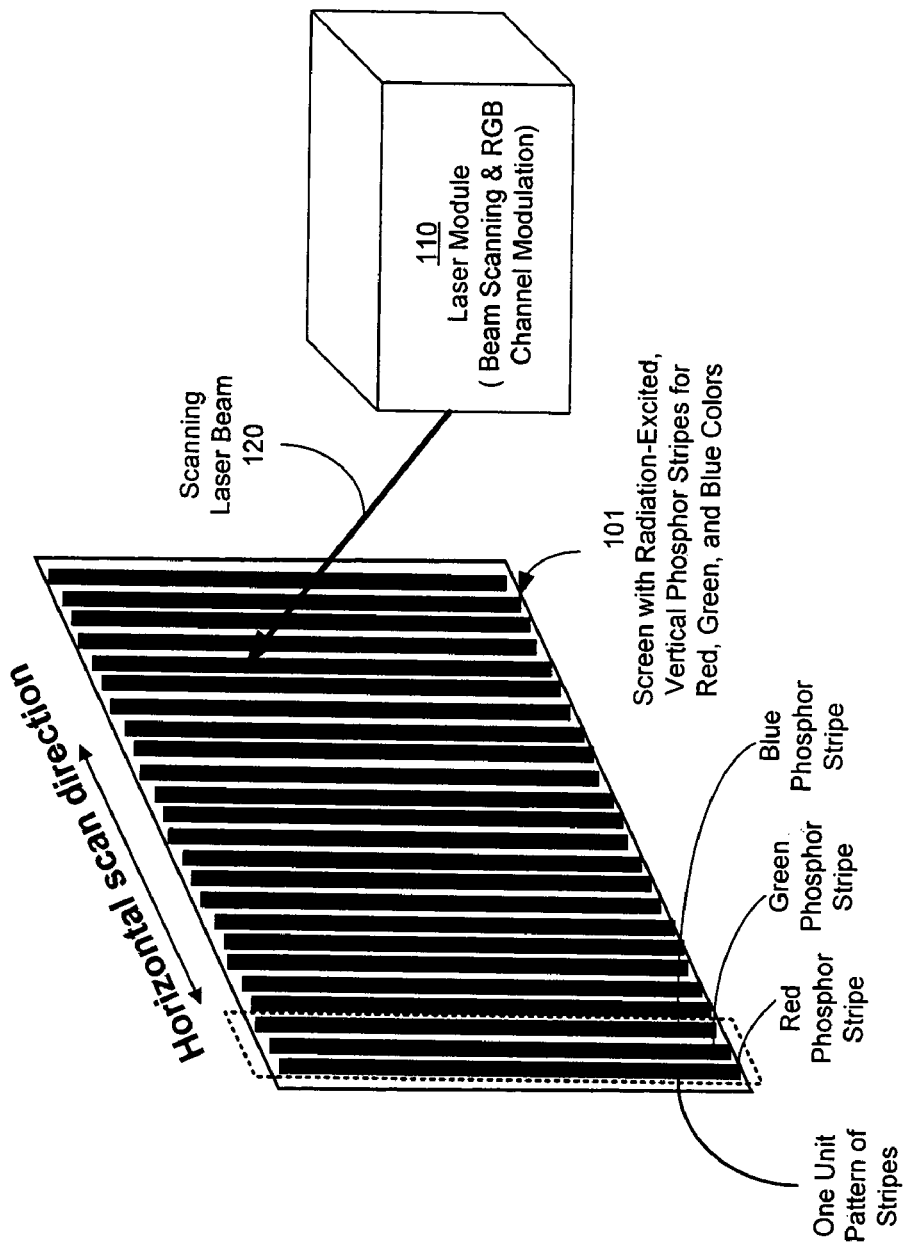
FIG. 1 shows an example scanning laser display system having a fluorescent screen made of laser-excitable phosphors emitting colored lights under excitation of a scanning laser beam that carries the image information to be displayed.

This application describes scanning beam display systems that use screens with fluorescent materials to emit light under optical excitation to produce images, including laser vector scanner display devices and laser video display devices that use laser excitable fluorescent screens to produce images by absorbing excitation laser light and emitting colored light. Various examples of screen designs with fluorescent materials are described. Screens with phosphor materials under excitation of one or more scanning excitation laser beams are described in detail and are used as specific implementation examples of optically excited fluorescent materials in various system and device examples in this application.

In one implementation, for example, three different color phosphors that are optically excitable by the laser beam to respectively produce light in red, green, and blue colors suitable for forming color images may be formed on the screen as pixel dots or repetitive red, green and blue phosphor stripes in parallel. Various examples described in this application use screens with parallel color phosphor stripes for emitting light in red, green, and blue to illustrate various features of the laser-based displays. Phosphor materials are one type of fluorescent materials. Various described systems, devices and features in the examples that use phosphors as the fluorescent materials are applicable to displays with screens made of other optically excitable, light-emitting, non-phosphor fluorescent materials.

For example, quantum dot materials emit light under proper optical excitation and thus can be used as the fluorescent materials for systems and devices in this application. More specifically, semiconductor compounds such as, among others, CdSe and PbS, can be fabricated in form of particles with a diameter on the order of the exciton Bohr radius of the compounds as quantum dot materials to emit light. To produce light of different colors, different quantum dot materials with different energy band gap structures may be used to emit different colors under the same excitation light. Some quantum dots are between 2 and 10 nanometers in size and include approximately tens of atoms such between 10 to 50 atoms. Quantum dots may be dispersed and mixed in various materials to form liquid solutions, powders, jelly-like matrix materials and solids (e.g., solid solutions). Quantum dot films or film stripes may be formed on a substrate as a screen for a system or device in this application. In one implementation, for example, three different quantum dot materials can be designed and engineered to be optically excited by the scanning laser beam as the optical pump to produce light in red, green, and blue colors suitable for forming color images. Such quantum dots may be formed on the screen as pixel dots arranged in parallel lines (e.g., repetitive sequential red pixel dot line, green pixel dot line and blue pixel dot line).

Examples of scanning beam display systems described here use at least one scanning laser beam to excite color light-emitting materials deposited on a screen to produce color images. The scanning laser beam is modulated to carry images in red, green and blue colors or in other visible colors and is controlled in such a way that the laser beam excites the color light-emitting materials in red, green and blue colors with images in red, green and blue colors, respectively.

Hence, the scanning laser beam carries the images but does not directly produce the visible light seen by a viewer. Instead, the color light-emitting fluorescent materials on the screen absorb the energy of the scanning laser beam and emit visible light in red, green and blue or other colors to generate actual color images seen by the viewer.

Laser excitation of the fluorescent materials using one or more laser beams with energy sufficient to cause the fluorescent materials to emit light or to luminesce is one of various forms of optical excitation. In other implementations, the optical excitation may be generated by a non-laser light source that is sufficiently energetic to excite the fluorescent materials used in the screen. Examples of non-laser excitation light sources include various light-emitting diodes (LEDs), light lamps and other light sources that produce light at a wavelength or a spectral band to excite a fluorescent material that converts the light of a higher energy into light of lower energy in the visible range. The excitation optical beam that excites a fluorescent material on the screen can be at a frequency or in a spectral range that is higher in frequency than the frequency of the emitted visible light by the fluorescent material. Accordingly, the excitation optical beam may be in the violet spectral range and the ultra violet (UV) spectral range, e.g., wavelengths under 420 nm. In the examples described below, UV light or a UV laser beam is used as an example of the excitation light for a phosphor material or other fluorescent material and may be light at other wavelength.

FIG. 1 illustrates an example of a laser-based display system using a screen having color phosphor stripes. Alternatively, color phosphor dots may also be used to define the image pixels on the screen. The system includes a laser module 110 to produce and project at least one scanning laser beam 120 onto a screen 101. The screen 101 has parallel color phosphor stripes in the vertical direction where red phosphor absorbs the laser light to emit light in red, green phosphor absorbs the laser light to emit light in green and blue phosphor absorbs the laser light to emit light in blue. Adjacent three color phosphor stripes are in three different colors. One particular spatial color sequence of the stripes is shown in FIG. 1 as red, green and blue. Other color sequences may also be used. The laser beam 120 is at the wavelength within the optical absorption bandwidth of the color phosphors and is usually at a wavelength shorter than the visible blue and the green and red colors for the color images. As an example, the color phosphors may be phosphors that absorb UV light in the spectral range from about 380 nm to about 420 nm to produce desired red, green and blue light. The laser module 110 can include one or more lasers such as UV diode lasers to produce the beam 120, a beam scanning mechanism to scan the beam 120 horizontally and vertically to render one image frame at a time on the screen 101, and a signal modulation mechanism to modulate the beam 120 to carry the information for image channels for red, green and blue colors. Such display systems may be configured as rear projection systems where the viewer and the laser module 110 are on the opposite sides of the screen 101. Alternatively, such display systems may be configured as front projection systems where the viewer and laser module 110 are on the same side of the screen 101.

Figure 2A:
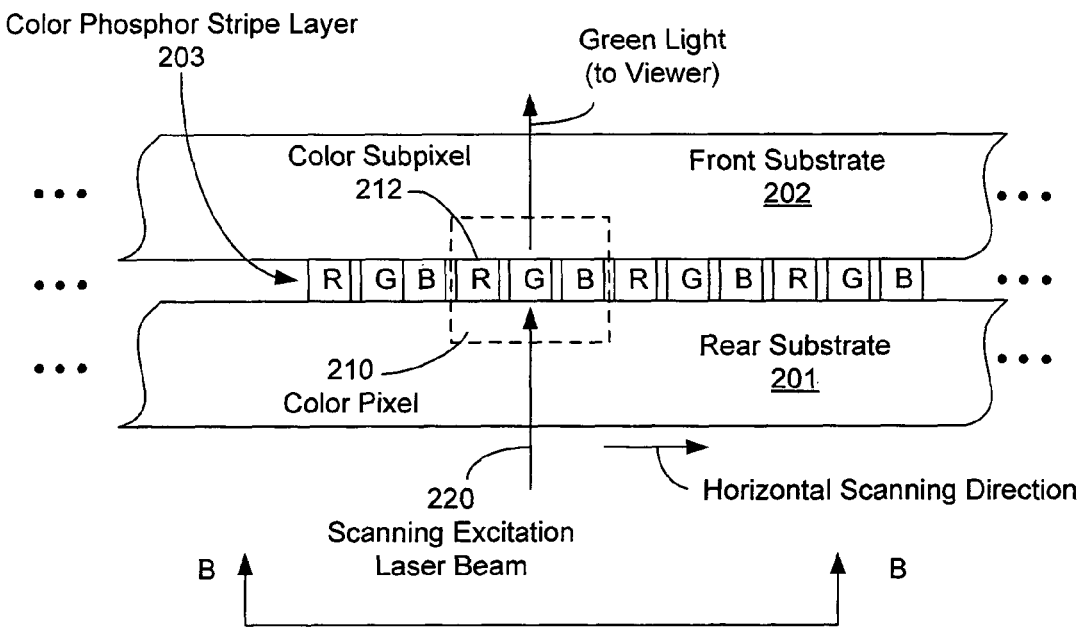
FIGS. 2A and 2B show one example screen structure and the structure of color pixels on the screen in FIG. 1.

FIG. 2A shows an exemplary design of the screen 101 in FIG. 1. The screen 101 may include a rear substrate 201 which is transparent to the scanning laser beam 120 and faces the laser module 110 to receive the scanning laser beam 120. A second front substrate 202, is fixed relative to the rear substrate 201 and faces the viewer in a rear projection configuration. A color phosphor stripe layer 203 is placed between the substrates 201 and 202 and includes phosphor stripes. The color phosphor stripes for emitting red, green and blue colors are represented by "R", "G" and "B," respectively. The front substrate 202 is transparent to the red, green and blue colors emitted by the phosphor stripes. The substrates 201 and 202 may be made of various materials, including glass or plastic panels. Each color pixel includes portions of three adjacent color phosphor stripes in the horizontal direction and its vertical dimension is defined by the beam spread of the laser beam 120 in the vertical direction. As such, each color pixel includes three subpixels of three different colors (e.g., the red, green and blue). The laser module 110 scans the laser beam 120 one horizontal line at a time, e.g., from left to right and from top to bottom to fill the screen 101. The laser module 110 is fixed in position relative to the screen 101 so that the scanning of the beam 120 can be controlled in a predetermined manner to ensure proper alignment between the laser beam 120 and each pixel position on the screen 101.

Figure 2B:
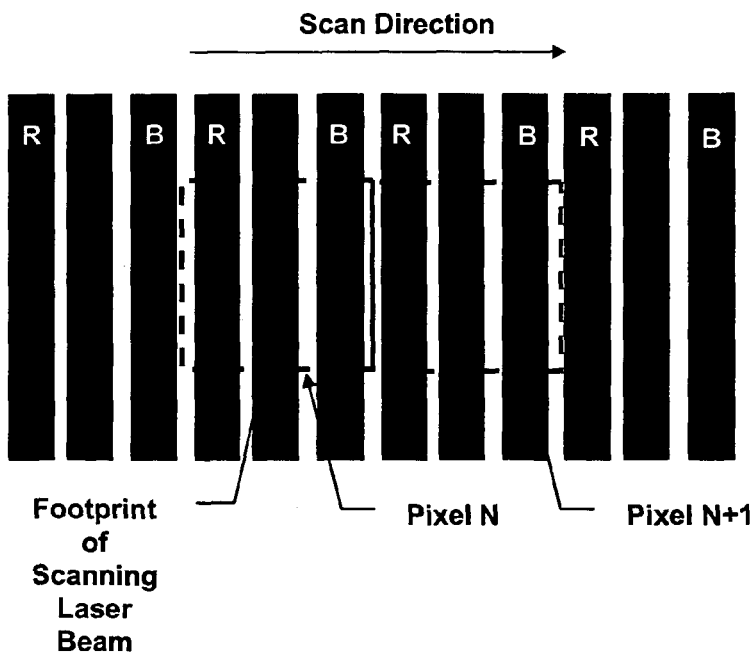

In FIG. 2A, the scanning laser beam 120 is directed at the green phosphor stripe within a pixel to produce green light for that pixel. FIG. 2B further shows the operation of the screen 101 in a view along the direction B-B perpendicular to the surface of the screen 101. Since each color stripe is longitudinal in shape, the cross section of the beam 120 may be shaped to be elongated along the direction of the stripe to maximize the fill factor of the beam within each color stripe for a pixel. This may be achieved by using a beam shaping optical element in the laser module 110. A laser source that is used to produce a scanning laser beam that excites a phosphor material on the screen may be a single mode laser or a multimode laser. The laser may also be a single mode along the direction perpendicular to the elongated direction phosphor stripes to have a small beam spread that is confined by the width of each phosphor stripe. Along the elongated direction of the phosphor stripes, this laser beam may have multiple modes to spread over a larger area than the beam spread in the direction across the phosphor stripe. This use of a laser beam with a single mode in one direction to have a small beam footprint on the screen and multiple modes in the perpendicular direction to have a larger footprint on the screen allows the beam to be shaped to fit the elongated color subpixel on the screen and to provide sufficient laser power in the beam via the multimodes to ensure sufficient brightness of the screen.

Figure 2C:
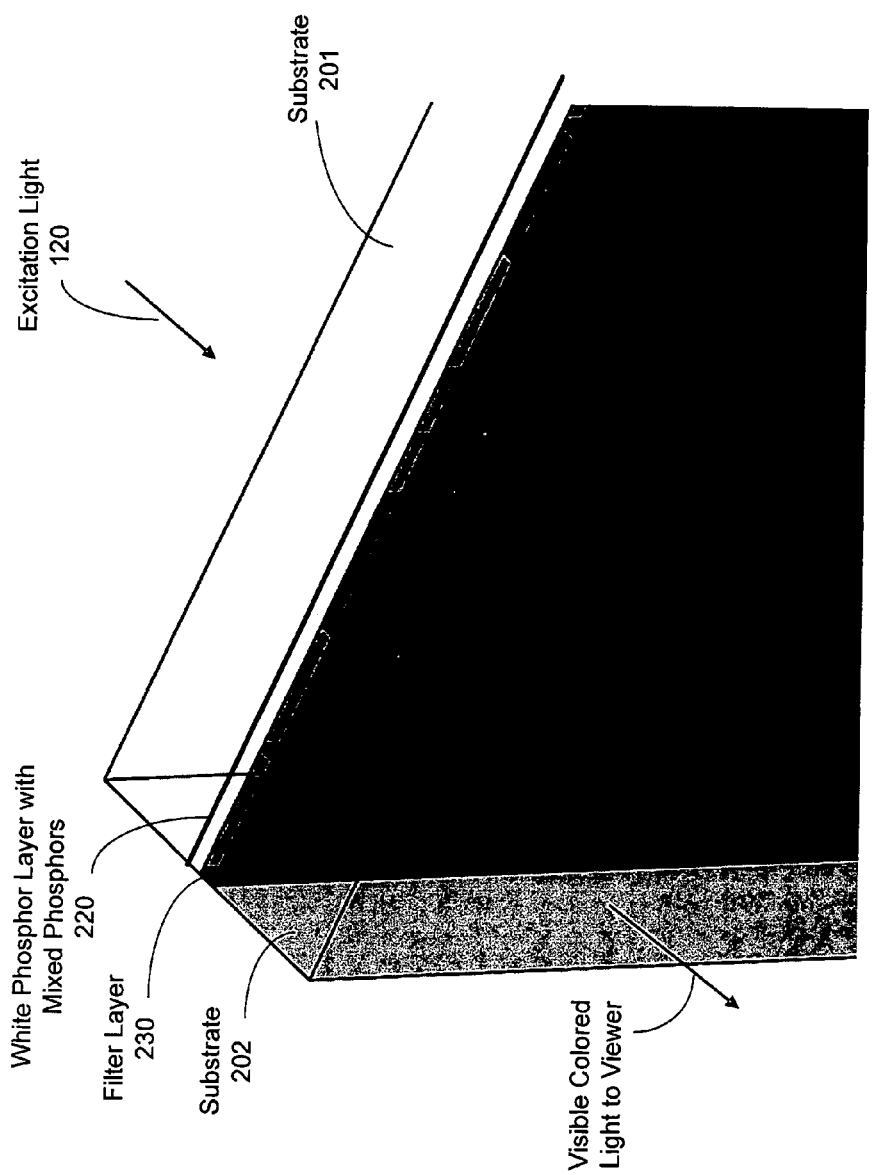
FIG. 2C shows another example for a fluorescent screen with fluorescent stripes formed by placing parallel optical filters over the layer of a uniform fluorescent layer which emits white light under optical excitation.

FIG. 2C illustrates another example of a fluorescent screen design that has a contiguous and uniform layer 220 of mixed phosphors. This mixed phosphor layer 220 is designed and constructed to emit white light under optical excitation of the excitation light 120. The mixed phosphors in the mixed phosphor layer 220 can be designed in various ways and a number of compositions for the mixed phosphors that emit white light are known and documented. Notably, a layer 210 of color filters, such as stripes of red-transmitting, green-transmitting and blue-transmitting filters, is placed on the viewer side of the mixed phosphor layer 220 to filter the white light and to produce colored output light. The layers 210 and 220 can be sandwiched between substrates 201 and 202. The color filters may be implemented in various configurations, including in designs similar to the color filters used in color LCD panels. In each color filter region e.g., a red-transmitting filter, the filter transmits the red light and absorbs light of other colors including green light and blue light. Each filter in the layer 210 may be a multi-layer structure that effectuates a bandpass interference filter with a desired transmission band. Various designs and techniques may be used for designing and constructing such filters. U.S. Pat. No. 5,587,818 entitled "Three color LCD with a black matrix and red and/or blue filters on one substrate and with green filters and red and/or blue filters on the opposite substrate," and U.S. Pat. No.

5,684,552 entitled "Color liquid crystal display having a color filter composed of multilayer thin films," for example, describe red, green and blue filters that may be used in the screen design in FIG. 2C. Hence, a fluorescent stripe in the fluorescent screen 101 in various examples described in this application is a fluorescent stripe that emits a designated color under optical excitation and can be either a fluorescent stripe formed of a particular fluorescent material that emits the designed color in FIG. 2A or a combination of a stripe color filter and a white fluorescent layer in FIG. 2C.

FIG. 3 shows an example implementation of the laser module 110 in FIG. 1. A laser array 310 with multiple lasers is used to generate multiple laser beams 312 to simultaneously scan the screen 101 for enhanced display brightness. A signal modulation controller 320 is provided to control and modulate the lasers in the laser array 310 so that the laser beams 312 are modulated to carry the image to be displayed on the screen 101. The signal modulation controller 320 can include a digital image processor that generates digital image signals for the three different color channels and laser driver circuits that produce laser control signals carrying the digital image signals. The laser control signals are then applied to modulate the lasers, e.g., the currents for laser diodes, in the laser array 310.

The beam scanning is achieved by using a scanning mirror 340 such as a galvo mirror for the vertical scanning and a multi-facet polygon scanner 350 for the horizontal scanning. A scan lens 360 is used to project the scanning beams form the polygon scanner 350 onto the screen 101. The scan lens 360 is designed to image each laser in the laser array 310 onto the screen 101. Each of the different reflective facets of the polygon scanner 350 simultaneously scans N horizontal lines where N is the number of lasers. In the illustrated example, the laser beams are first directed to the galvo mirror 340 and then from the galvo mirror 340 to the polygon scanner 350. The output scanning beams 120 are then projected onto the screen 101. A relay optics module 330 is placed in the optical path of the laser beams 312 to modify the spatial property of the laser beams 312 and to produce a closely packed bundle of beams 332 for scanning by the galvo mirror 340 and the polygon scanner 350 as the scanning beams 120 projected onto the screen 101 to excite the phosphors and to generate the images by colored light emitted by the phosphors.

The laser beams 120 are scanned spatially across the screen 101 to hit different color pixels at different times. Accordingly, each of the modulated beams 120 carries the image signals for the red, green and blue colors for each pixel at different times and for different pixels at different times. Hence, the beams 120 are coded with image information for different pixels at different times by the signal modulation controller 320. The beam scanning thus maps the time-domain coded image signals in the beams 120 onto the spatial pixels on the screen 101. For example, the modulated laser beams 120 can have each color pixel time equally divided into three sequential time slots for the three color subpixels for the three different color channels. The modulation of the beams 120 may use pulse modulation techniques to produce desired grey scales in each color, a proper color combination in each pixel, and desired image brightness.

In one implementation, the multiple beams 120 are directed onto the screen 101 at different and adjacent vertical positions with two adjacent beams being spaced from each other on the screen 101 by one horizontal line of the screen 101 along the vertical direction. For a given position of the galvo mirror 340 and a given position of the polygon scanner 350, the beams 120 may not be aligned with each other along the vertical direction on the screen 101 and may be at different positions on the screen 101 along the horizontal direction. The beams 120 can only cover one portion of the screen 101. At a fixed angular position of the galvo mirror 340, the spinning of the polygon scanner 350 causes the beams 120 from N lasers in the laser array 310 to scan one screen segment of N adjacent horizontal lines on the screen 101. At end of each horizontal scan over one screen segment, the galvo mirror 340 is adjusted to a different fixed angular position so that the vertical positions of all N beams 120 are adjusted to scan the next adjacent screen segment of N horizontal lines. This process iterates until the entire screen 101 is scanned to produce a full screen display.

Figure 4:
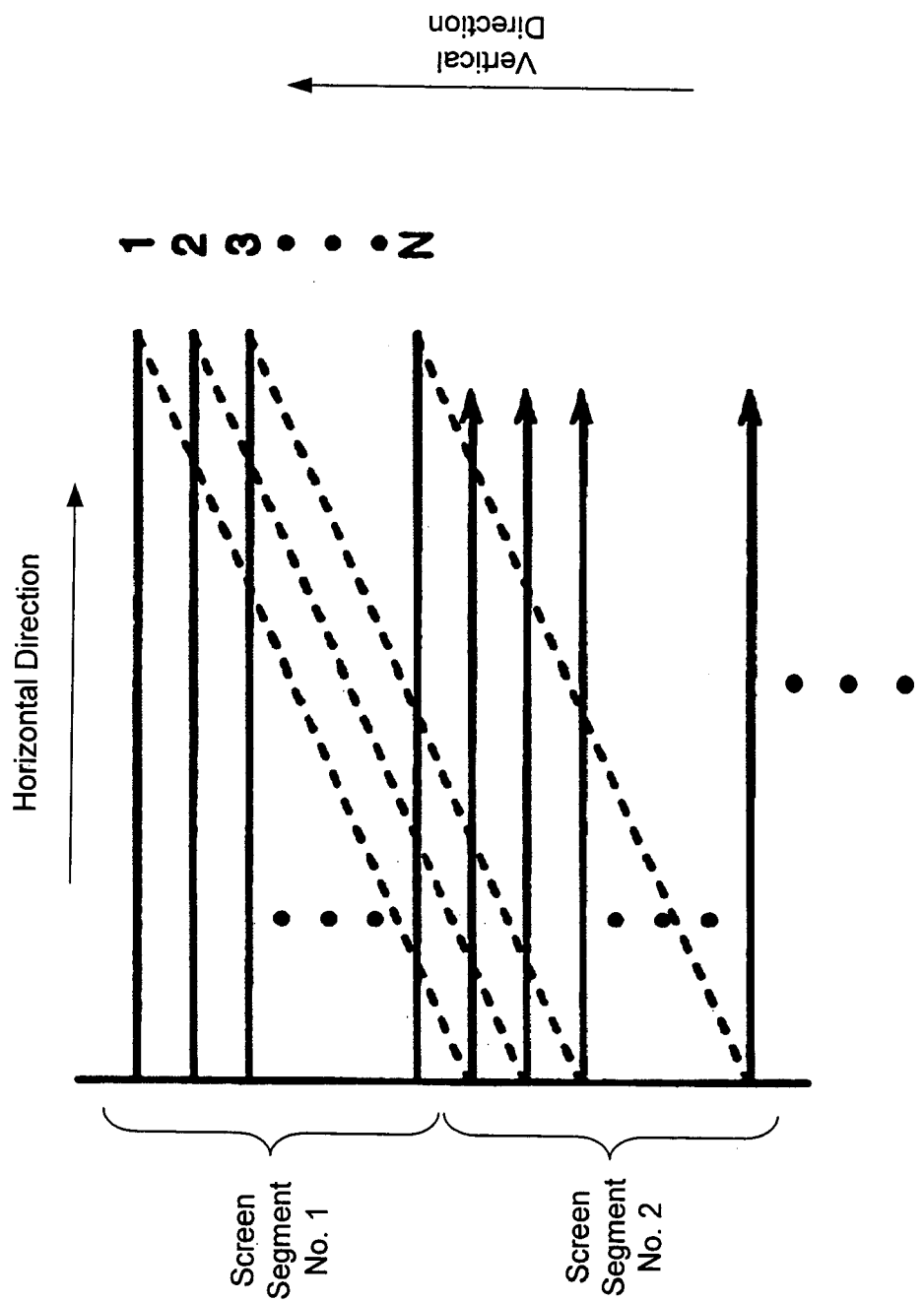
FIG. 4 illustrates one example of simultaneous scanning of multiple screen segments with multiple scanning laser beams.

FIG. 4 illustrates the above simultaneous scanning of one screen segment with multiple scanning laser beams at a time and sequentially scanning consecutive screen segments. Visually, the beams 120 behaves like a paint brush to "paint" one thick horizontal stroke across the screen 101 at a time to cover one screen segment and then subsequently to "paint" another thick horizontal stroke to cover an adjacent vertically shifted screen segment. Assuming the laser array 310 has 36 lasers, a 1080-line progressive scan of the screen 101 would require scanning 30 vertical screen segments for a full scan. Hence, this configuration in an effect divides the screen 101 along the vertical direction into multiple screen segments so that the N scanning beams scan one screen segment at a time with each scanning beam scanning only one line in the screen segment and different beams scanning different sequential lines in that screen segment. After one screen segment is scanned, the N scanning beams are moved at the same time to scan the next adjacent screen segment.

In the above design with multiple laser beams, each scanning laser beam scans only a number of lines across the entire screen along the vertical direction that is equal to the number of screen segments. Hence, the polygon scanner for the horizontal scanning can operate at a slower speed than a scanning speed needed for a single beam design where the single beam scans every line of the entire screen. For a given number of total horizontal lines on the screen (e.g., 1080 lines in HDTV), the number of screen segments decreases as the number of the lasers increases. Hence, with 36 lasers, the galvo mirror 340 and the polygon scanner 350 scan 30 lines per frame while a total of 108 lines per frame are scanned when there are only 10 lasers. Hence, the use of the multiple lasers can increase the image brightness which is approximately proportional to the number of lasers used and, at the same time, can also advantageously reduce the response speeds of the scanning system.

The vertical beam pointing accuracy is controlled within a threshold in order to produce a high quality image. When multiple scanning beams are used to scan multiple screen segments, this accuracy in the vertical beam pointing should be controlled to avoid or minimize an overlap between two adjacent screen segments because such an overlap in the vertical direction can severely degrade the image quality. The vertical beam pointing accuracy should be less than the width of one horizontal line in implementations.

This misalignment between two adjacent screen segments can be digitally corrected through modulation of the laser beams 312 by the signal modulation controller 320. Each segment of the screen can be driven with a scan engine capable of generating more horizontal lines than actually required for display in that segment (e.g., 4 extra lines). In a perfectly aligned situation, the beam scanning of the system can be configured to have an equal number of extra (unused) lines above and below a segment image for each screen segment. If vertical misalignment exists, the control electronics in the signal modulation controller 320 can shift the segment image upwards or downwards by utilizing these extra lines in place of the normal lines. For example, if the image needs to be moved upwards one line, the controller 320 operates to cause each line to move upwards to the previous one, utilizing one of the extra lines above the normal image and adding an extra unused line at the bottom. If this adjustment is desired to take place automatically during the startup or normal operation of the system, an optical sensor can be used to provide feedback in real time. This optical sensor may be a position sensing photodiode located to either side of the viewable area of the screen segment to be controlled. The line would over scan onto this sensor when required. Alternatively, an optical beam splitter may be used to provide feedback during the viewable portion of the scan. One of the advantages of the above method for vertical alignment of different screen segments is to reduce or simplify the requirement for accurate optical alignment because the electronic adjustment, when properly implemented, is simpler to implement and can reduce cost of the system.

The above described method allows adjustment with a resolution of only one line along the vertical direction. To accomplish a sub-line (sub-pixel) adjustment along the vertical direction, the scan engine for scanning the excitation beam can be rotated slightly. This produces slightly diagonal horizontal scan lines. The adjacent screen segments would have scan engines slightly rotated on the opposite direction. Under this condition, to create a straight horizontal line, portions of at least two scan lines are used depending on the amount of the rotation. This can produce a less noticeable junction between two neighboring screen segments.

Figure 5B:
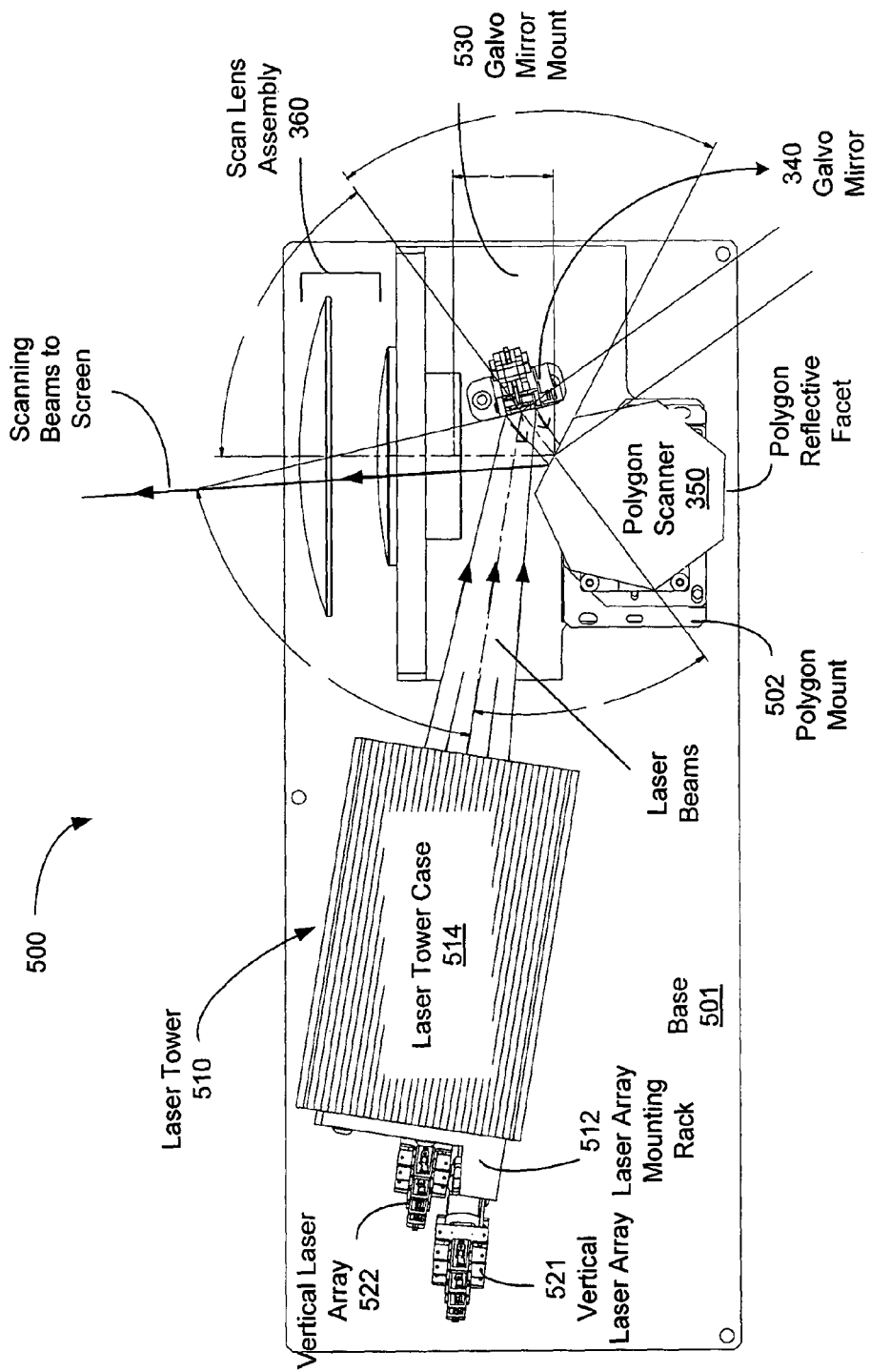

FIGS. 5A and 5B show an example laser module 500 for a scanning beam display system using an array 310 of lasers 520 to generate multiple scanning beams based the designs in FIGS. 3 and 4. The laser module 500 includes a base 510 on which other components are mounted at predetermined fixed positions. A laser tower 510 mounted on one end of the base 501 as the light source for the laser module 500. The laser tower 510 includes a laser array mounting rack 512 that holds multiple lasers 520 of the laser array 310 which produces multiple laser beams and delivers a sufficient amount of total laser power to the fluorescent screen 101 for desired display brightness. The laser tower 510 includes a laser tower case 514 that covers part of the laser tower 510 and forms a partial enclosure for holding the laser array mounting rack 512 and the part of optical pathways of the laser beams.

The laser array mounting rack 512 has a structure to hold lasers 520 at different positions along the vertical direction and different horizontal positions above the base 501. As illustrated, the lasers 520 can be held in different vertical arrays that are spatially shifted or staggered relative to one another along two orthogonal direction in a plane parallel to the base 501. For example, one vertical laser array 521 is shown in FIG. 5A and two adjacent staggered vertical laser arrays 521 and 522 are shown in FIG. 5B. The lasers 520 in each vertical array are oriented by the design of the laser array mounting rack 512 to direct respective laser beams in a fan configuration as converging beams to point to the galvo mirror 340 mounted on a galvo mirror mount 530 on the base 501. The galvo mirror mount 530 can include a driver circuit for operating and controlling the galvo mirror 350.

FIG. 5B shows a bird's eye view of the laser module 500 along the direction B-B as indicated in FIG. 5A. The folded beam paths of the laser beams are used to reduce the size of the laser module 500. Notably, the lasers 520 are spatially staggered along the laser beam direction to form a three-dimensional array and produce a cone of converging laser beams that are directed to the galvo mirror 340. The staggering arrangement allows two neighboring vertical arrays, e.g., the vertical arrays 521 and 522, to be spatially close to each other with an array-to-array spacing less than the spacing between two lasers when placed in a common plane. The two vertical arrays 521 and 522 are staggered in space to have different distances from the scanning module which includes the galvo mirror 340 and the polygon scanner 350. As shown in FIG. 3, the converging laser beams are directed through a relay optical module 330 and are transformed into a bundle of closely packed beams before reaching the galvo mirror 340. The galvo mirror 340 scans and reflects the bundle of closely packed beams to the polygon scanner 350. A polygon mount 502 on the base 501 is provided to hold the polygon scanner 350 and includes a motor for spinning the polygon scanner 350, a power supply and a polygon control circuit. A lens mount 550 on the base 501 is used to hold a scan lens assembly 540 to receive the scanning laser beams from the polygon scanner 350 and to project the received scanning beams onto the screen.

The following sections describe implementation examples and details of various optical components in the laser module 500.

The laser array mounting rack 512 can be designed to hold the lasers 520 at respective positions and orientations so that each laser beam is directed at a proper direction towards the relay optics module 330 and the galvo mirror 340. The laser mounting by the laser array mounting rack 512 is approximate and can deviate from a desired optical alignment for each laser 520 in part due to variations and tolerances in machining of the laser array mounting rack 512, aging of the structure, thermal fluctuations and other factors. The laser module 500 can include one or more mechanisms to control the direction of each laser beam to optically assign each beam for optimized operation.

Figure 6:
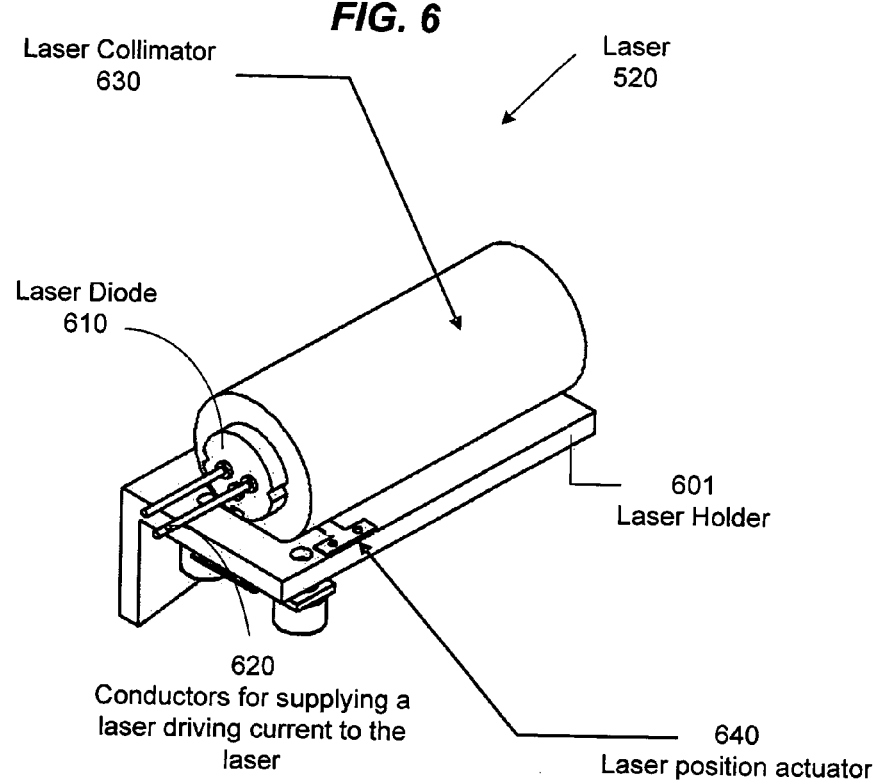
FIGS. 6, 7, 8 and 9 show examples of lasers having laser actuators that control the vertical direction of the laser beam.

FIG. 6 shows an example of each laser 520 with a laser actuator that controls the laser beam direction. The laser 520 includes a laser diode or a semiconductor-based laser 610, a laser collimator 630 that is fixed relative to the laser diode 610, and a laser position actuator 640 engaged to the assembly of the laser diode 610 and laser collimator 630. The laser diode 610 includes conductor leads 620 that are connected to the laser driver circuit to receive a modulated driver current which generates and modulates the laser beam to carry image data. A laser holder 601 is used as a base to hold the above components and to mount the laser 520 to the laser array mounting rack 512. Because the laser diode 610 and laser collimator 630 in this design are fixed to each other as an integral the assembly, the laser position actuator 640 can be used to tilt the orientation of the assembly of the laser diode 610 and laser collimator 630 relative to the laser holder 601 without changing the relative position or orientation of the laser diode 610 and the laser collimator 630. The tilting of the assembly of the laser diode 610 and laser collimator 630 can be along a single axis, e.g., a horizontal axis parallel to the horizontal rotation axis of the galvo mirror 340. This laser position actuator 640 can be a flexure actuator using a piezoelectric material and can be used for precisely controlling the vertical beam position of each laser beam on the screen.

Figure 7:
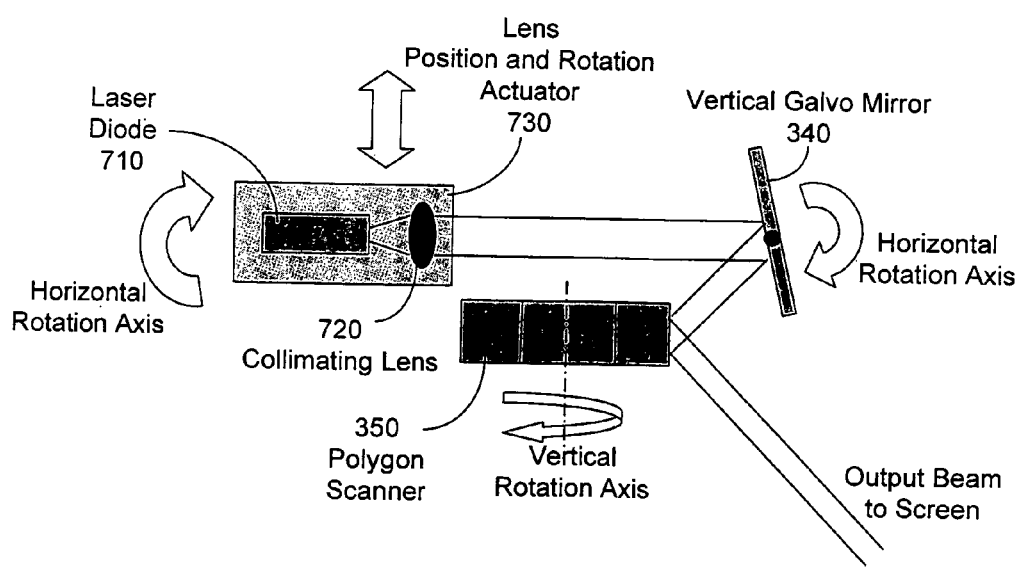
Figure 8:
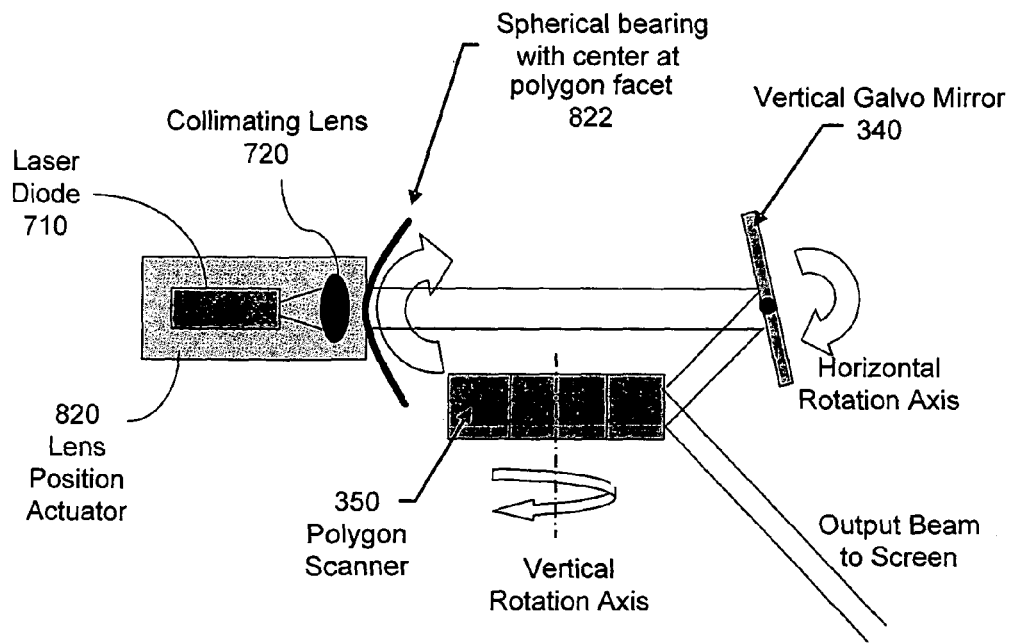
Figure 9:
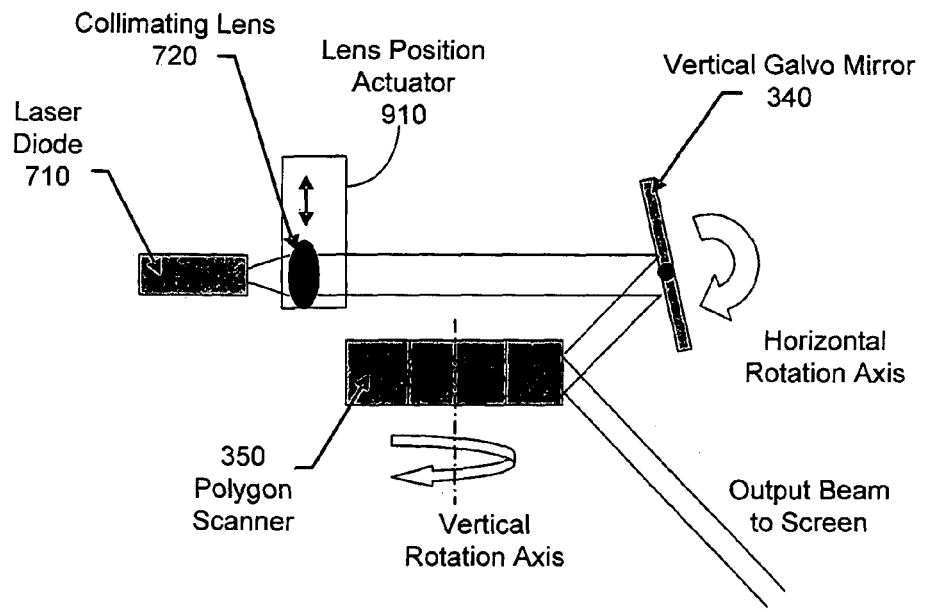

FIGS. 7, 8 and 9 show other designs for controlling the beam pointing. Each design includes a beam control actuator at the laser to control the pointing of the beam while the galvo mirror near the polygon is used to control the vertical beam scanning. The implementation of this beam control actuator and the above described controls in FIG. 6 allows software control of the static and dynamic beam pointing for each laser.

In FIG. 7, a laser 710 such as a diode laser is used to generate the scanning laser beam which may be at a UV or violet wavelength. A collimating lens 720 in front of the laser diode 710 is mounted to a lens position actuator 730 and is used to collimate the laser light. The lens position actuator 730 can be operated to move the assembly of the laser diode 710 and the collimating lens 720 as a single unit in a direction perpendicular to the laser beam and to tilt the assembly to change the pointing of the laser beam in the vertical direction. This vertical adjustment of the lens position actuator 830 causes a vertical displacement of the laser beam on the screen. The position actuator 730 is designed and controlled to make the vertical displacement on the screen with a resolution much less than the width of one horizontal scanning line.

The lens position actuator 730 may be implemented in various configurations. For example, a lens position actuator similar to an lens actuator used in a DVD drive optical pick-up unit may be used. Such a lens actuator may include, e.g., a focus actuator and an integrated laser diode, and can be produced in a large volume at a low cost. The size of the DVD lens actuator is compact and the dynamic response of the actuator is suitable for the vertical adjustment for display systems in this application. Some lens actuators can produce a displacement of about 1 mm. The laser beam may be controlled to tilt around a pivot located on each polygon facet of the polygon scanner 350 to eliminate or minimize the beam displacement on the polygon facet.

FIG. 8 shows another implementation where a lens rotation actuator 810 is engaged to the laser diode 710 and the collimating lens 720 to tilt the laser beam without changing the relative position of the laser 710 and the collimating lens 720. This tilting or rotation of the collimated laser diode assembly with both the laser 710 and the collimating lens 720 changes the vertical beam pointing on the screen and thus causes a vertical displacement on the screen. The lens rotation actuator 820 is designed and controlled to make the vertical displacement on the screen to have a resolution much less than the width of one horizontal scanning line. Various bearing designs may be used to tilt or rotate the laser assembly, including a flexure, a ball bearing, a jewel bearing, etc. Also, various actuator technologies may also be used, including a voice coil motor, a Nitinol wire actuator, a piezo actuator, an electro-restrictive actuator, and other electromechanical actuators and electromagnetic actuators. The beam focusing of this design is essentially fixed and is not affected by the vertical displacement actuator. The laser beam may be controlled to tilt around a pivot located on the polygon facet to eliminate or minimize the beam displacement on the polygon facet.

A spherical bearing 822 may be used to change the vertical beam pointing on the screen. The assembly of the laser diode 710 and the collimating lens 720 as a whole is movably engaged to the spherical bearing 822 and the actuator 820 operates to causes the assembly to move along the spherical bearing 822. The spherical bearing 822 can be designed to have a radius equal to the distance from the assembly of the laser diode 710 and the collimating lens 720 to the polygon facet, resulting in a rotation about the polygon facet. Other mechanism (e.g. linkage) may be used to simulate the spherical bearing motion path.

FIG. 9 further shows a design where a lens position actuator 910 is engaged to the collimating lens 720 to shift the position of the collimating lens relative to the laser diode 710 along the path perpendicular to the laser beam. This control can be used to control the alignment of the laser beam and the beam position on the screen along the vertical direction.

One of the technical challenges in implementing multiple lasers for simultaneous scanning is to pack the multiple lasers closely to one another in space to produce a single-pixel separation between two adjacent horizontal lines produced by two simultaneously scanning laser beams from two different lasers on the screen. Due to the transverse dimension of each laser which includes a laser diode and a collimating lens, a large array of lasers, when arranged as a two-dimensional array, produces a bundle of laser beams with a large foot print with a spacing between two adjacent lasers larger than the dimension of one pixel on the screen. To reduce the spacing between the adjacent laser beams and to reduce the dimension of the laser array, the lasers can be staggered in a three-dimensional array as shown in the example in FIGS. 5A and 5B. However, it remains difficult to achieve a one-pixel beam spacing between adjacent beams on the screen in such a staggered three-dimension laser array. One way to solve this technical problem is to design the relay optics module 330 to control the spacing between two adjacent beams along the vertical direction to equal to one pixel on the screen 101.

Figure 10:
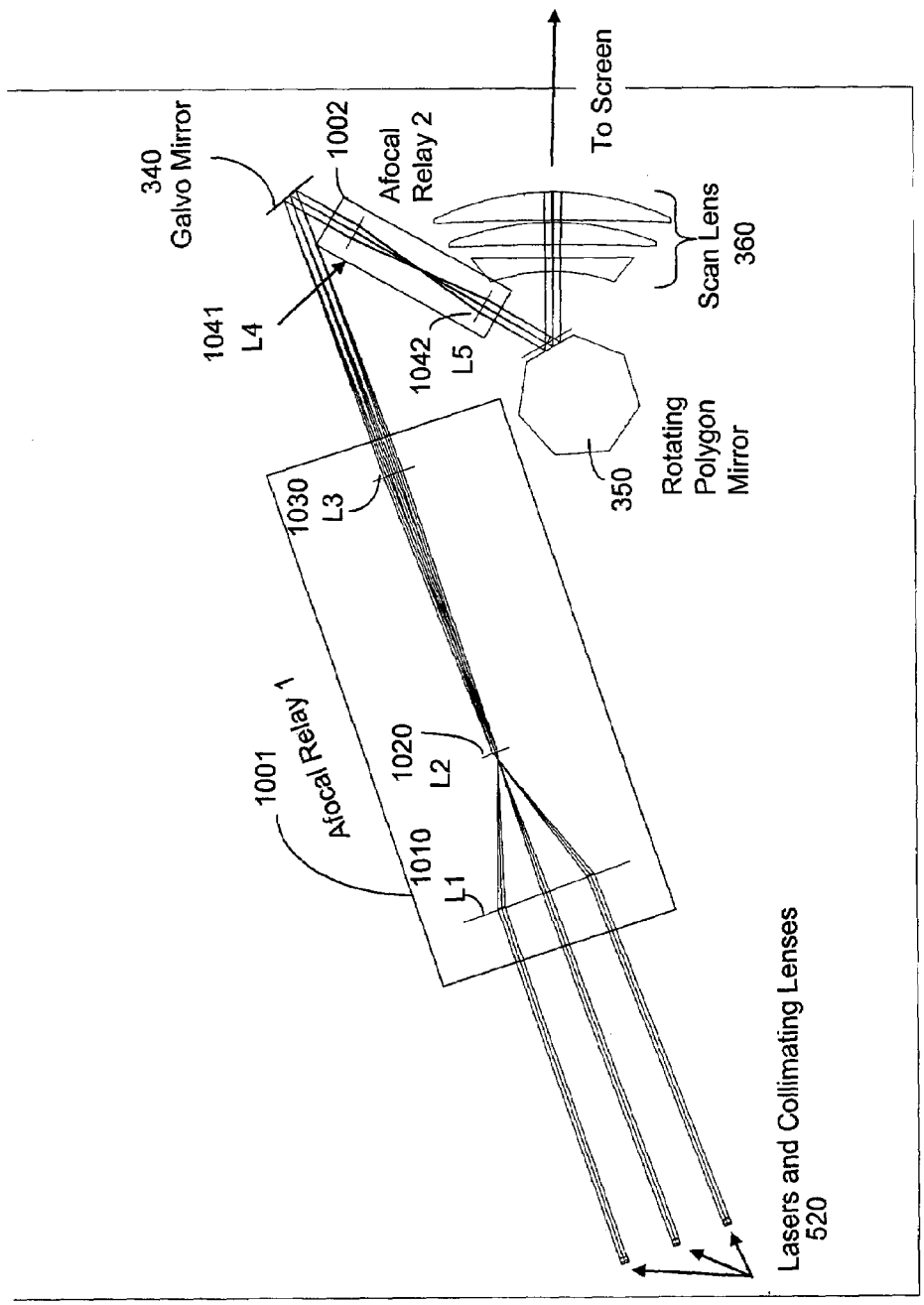
FIG. 10 shows an optical layout of a laser module for implementing the scanning laser module in FIG. 3.

FIG. 10 shows one example of an afocal relay 1001 as the relay optics module 330 in FIG. 3. The afocal relay 1001 is placed in the optical paths of the laser beams 312 from lasers in the laser array 310 in FIG. 3. Each laser in the laser array 310 may be implemented as a combination of a laser diode and a laser collimator lens, such as the laser diode 610 and the laser collimator 630 in FIG. 6, and the laser diode 710 and the collimator lens 720 in FIGS. 7-9. The afocal relay 1001 includes three optically positive lenses: a first lens 1010 (L1) with a focal length f1, a second lens 1020 (L2) with a focal length f2 and a third lens 1030 (L3) with a focal lens f3. The first lens 1010 is a converging lens that has a large aperture to receive the beams 312 with a large beam-to-beam spacing and is spaced from the second lens 1020, a field lens, by a spacing equal to or near its own focal length f1. The focal length f2 of the second lens 1020 is less than the focal length f1 of the first lens 1010.

In operation, the first lens 1010 focuses the received beams 312 to the second lens 1020 and the first and second lenses 1010 and 1020 collectively reduce the beam size of each beam and the angular beam-to-beam spacing. The focal lengths f1 and f2 are selected to achieve the desired reduction in the beam across section for each beam and the beam-to-beam spacing at the output of the afocal relay 1001. The third lens 1030 has a focal length f3 greater than the focal length f2 and is spaced from the second lens 1020 by its focal length f3. Under this design, the third lens 1030 collimates the diverging beams from the second lens 1020 and controls the location of the exit pupil, i.e., the plane where output beams completely overlap one another. In the present system, the exit pupil is designed to be at the galvo mirror 340. As an example, for a given set of laser collimators 720 or 630 used in the laser array 310, the focal lengths for the three lenses 1010, 1020 and 1030 in the afocal relay 1001 can be 100 mm, 5.128 mm and 200 mm, respectively. Under this specific design, the overall magnification of the afocal relay 1001 is 2 so that the diameter of each output beam leaving the third lens 1030 is twice the diameter of each input beam received by the first lens 1010. Alternatively, the afocal relay 1001 can be configured to have a magnification factor different from 1:2 such as a magnification of 1:1.

FIG. 10 further shows a second afocal relay 1002 in the optical path between the galvo mirror 340 and the polygon scanner 350 to image the surface of the reflective surface of the galvo mirror 340 onto a polygon facet that currently reflects the beams to the screen 101. This imaging effectively makes the galvo mirror 340 coincident with the currently reflecting polygon facet which, in turn, is coincident with the entrance pupil of the scan lens 340. Therefore, the entrance pupil of the scan lens 340 is the pivot point for the scanning beams directed to the scan lens 360. The scan lens 360 per-forms best when the input beams pivot about a single entrance pupil; hence there is a reduction in the optical distortions that would otherwise occur between successive horizontal scan lines that leave the galvo mirror 240 at different vertical angles. The second afocal relay 1002 can be implemented by different imaging lens systems and may include, for example, two lenses 1041 (L4) and 1042 (L5) in a 4 f imaging configuration with a magnification of 1 as illustrated.

The scan lens 360 is designed to image lasers 520 onto the screen 101. In one implementation, the scan lens 360 can be a two-dimensional f-theta lens that is designed to have a linear relation between the location of the focal spot on the screen and the input scan angle (theta) when the input beam is scanned around each of two orthogonal axes perpendicular to the optic axis of the scan lens. Such a scan lens is different from a conventional imaging lens in which the location of the focal spot on the screen is a tangent function of the input scan angle (theta). Some technical features of certain f-theta lenses can be found in, e.g., U.S. Pat. No. 4,401,362 and Chapter 22 in "Modern Lens Design" by Warren J. Smith (McGraw-Hill, 1992).

Figure 11:
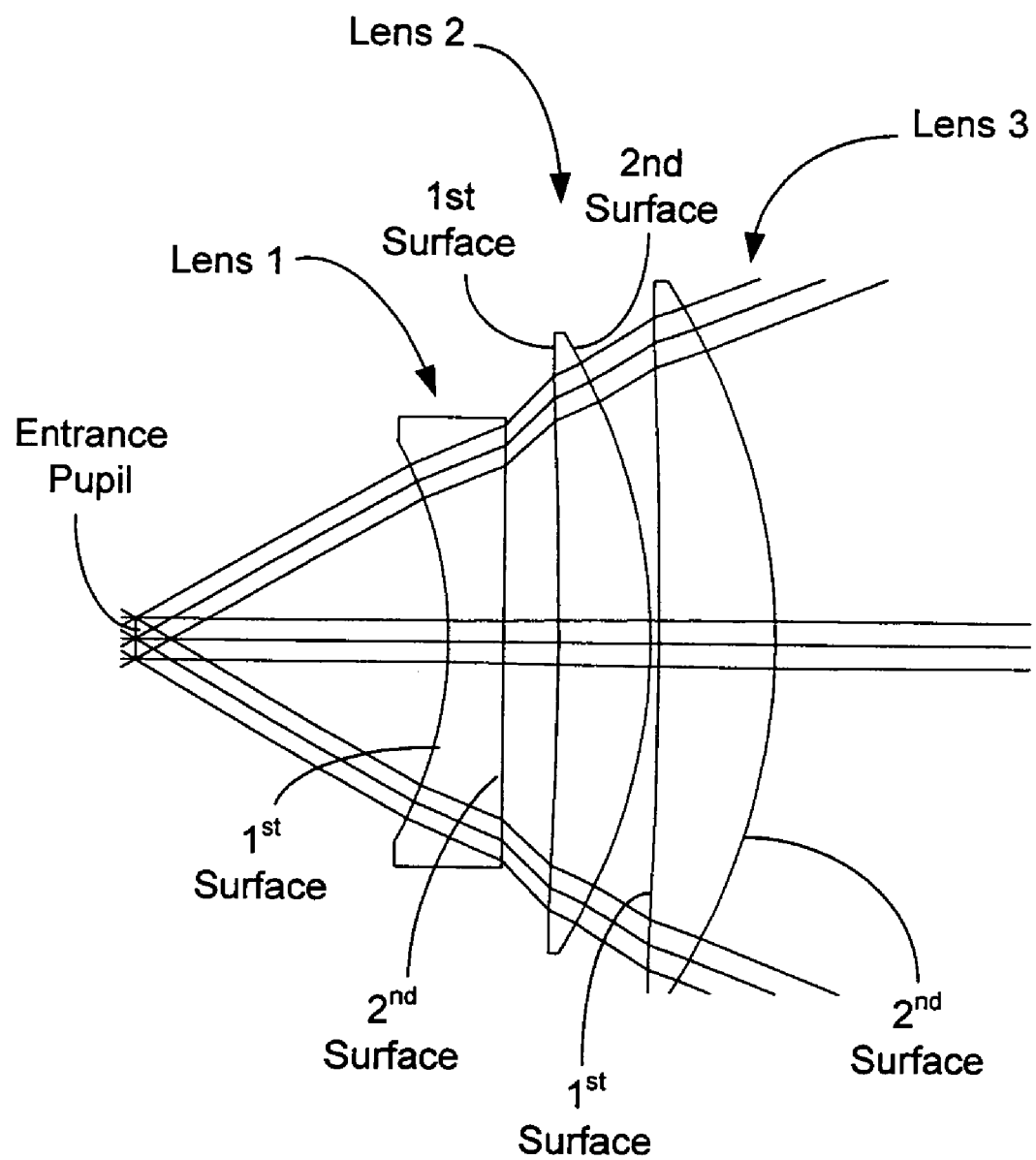
FIG. 11 shows an example of a two-dimensional f-theta scan lens with three lens elements.

FIG. 11 shows one example design of the two-dimensional f-theta lens for the scan lens 360. In this example, the scan lens has three lens elements: lens 1, lens 2 and lens 3. TABLE 1 shows the prescription of parameters of the three lens elements of the two dimensional scan lens in FIG. 11.

TABLE 1

| Surf. No. | Description | Radius of Curvature [mm] | Thickness [mm] | Index of Refraction | Clear Aperture [mm] |
|---|---|---|---|---|---|
| 1 | Entrance Pupil | n/a | 51.000 | | 10.0 |
| 2 | Lens 1 Surface 1 | −129.17 | 9.000 | 1.58558 | 92.1 |
| 3 | Lens 1 Surface 2 | ∞ | 9.120 | | 102.6 |
| 4 | Lens 2 Surface 1 | −1543.30 | 15.000 | 1.49858 | 122.2 |
| 5 | Lens 2 Surface 2 | −182.00 | 1.500 | | 142.1 |
| 6 | Lens 3 Surface 1 | −1867.12 | 19.000 | 1.52981 | 145.6 |
| 7 | Lens 3 Surface 2 | ∞ | 181.500 | | 167.0 |
| 8 | Focal plane | n/a | 1299.500 | | |

Figure 12:
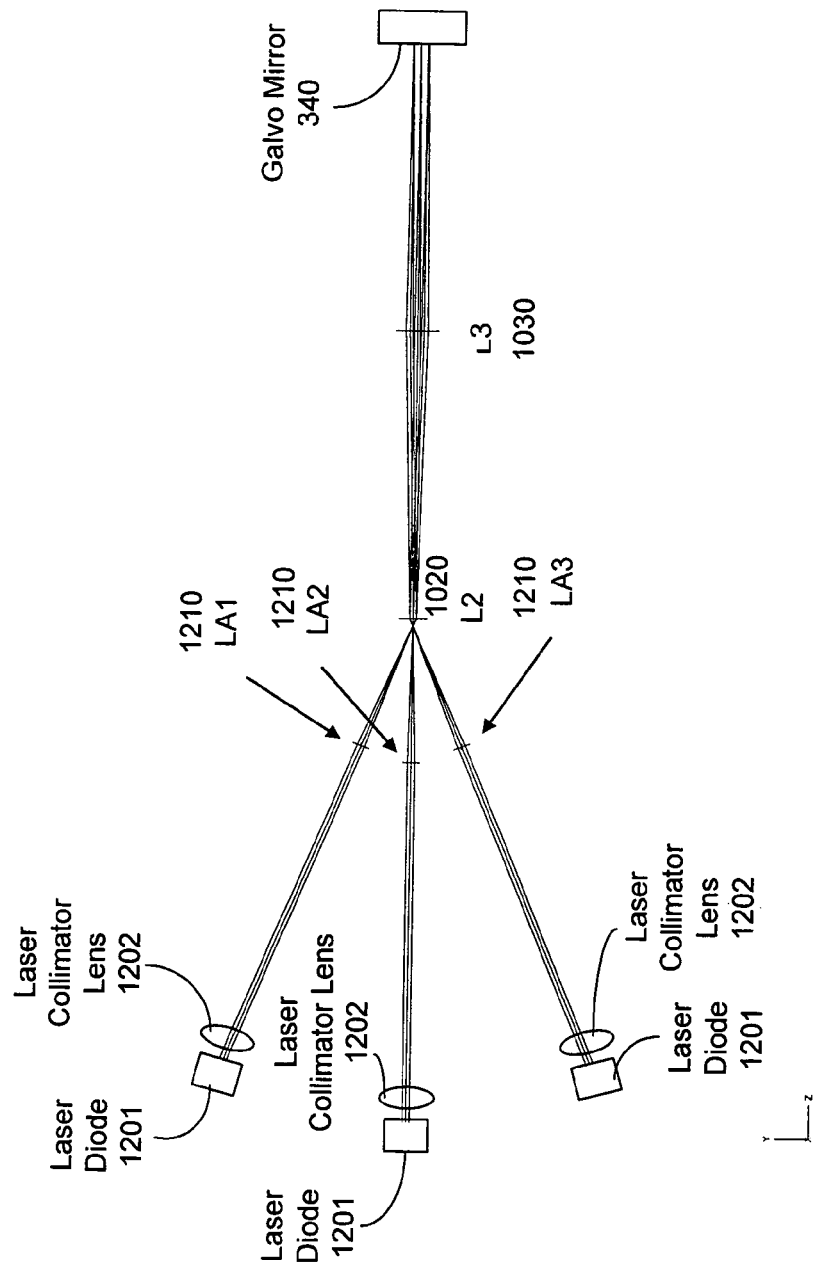
FIG. 12 shows an alternative design of an afocal relay in FIG. 10.

In the afocal relay 1001 in FIG. 10, the first lens 1010 (L1), the converging lens, is a single lens with a large aperture to accommodate for the large bundle of beams from the laser array. Such a large converging lens 1010 can be expensive and thus can increase the cost of the system. FIG. 12 shows an alternative implementation where the single first lens 1010 is replaced by an array of individual small converging lenses 1210 which are tilted in different directions to receive different input laser beams from the lasers such that the refracted beams output by the small lenses 1210 follow the paths of the refracted beams produced by the single lens 1010. Each laser includes a laser diode 1101 and a laser collimator lens 1202. Hence, the design of the afocal relay 1001, e.g., the magnification factor of the afocal relay 1001, can vary with the design parameters of the laser collimator lenses 1202. Because each small converging lens 1110 only receives and focuses a single beam, the aperture of the small converging lens 1110 can be much smaller than the single lens 1010. In addition, the small converging lens 1010 can be aligned to use its center to receive a respective input laser beam, the lens distortions caused by different beam incident angles and at different incident locations away from the lens center on the small converging lens 1210 are less problematic than using the single lens 1010 to receive different beams. Therefore, an relatively inexpensive lens with a small aperture can be sufficient for the lens 1210.

TABLE 2 provides a specific design example for the afocal relay 1001 in FIG. 12. In this example, the afocal 1001 is a 1:2 afocal system. Each of the lenses 1210 is a single lens with two surfaces (first and second surfaces), the lens 1020 has two lenses with four lens surfaces (first, second, third and fourth surfaces), and the lens 1030 is a single lens with two lens surfaces (first and second surfaces).

TABLE 2

| Surf. No. | Description | Radius of Curvature [mm] | Thickness [mm] | Index of Refraction | Clear Aperture [mm] |
|---|---|---|---|---|---|
| 1 | Lens 1110 (L1) Surface 1 | 52.972 | 2.000 | | 6.0 |
| 2 | Lens 1110 (L1) Surface 2 | ∞ | 94.495 | 1.52972 | 6.0 |
| 3 | Lens 1020 (L2) Surface 1 | −16.306 | 4.545 | 1.71793 | 2.6 |
| 4 | Lens 1020 (L2) Surface 2 | −2.000 | 2.198 | | 2.6 |
| 5 | Lens 1020 (L2) Surface 3 | 4.666 | 6.000 | 1.71793 | 3.4 |
| 6 | Lens 1020 (L2) Surface 4 | −95.497 | 181.500 | | 3.4 |
| 7 | Lens 1030 (L3) Surface 1 | ∞ | 3.000 | 1.46958 | 15.0 |
| 8 | Lens 1030 (L3) Surface 2 | −88.477 | 200.000 | | 15.0 |
| | Exit Pupil | n/a | n/a | | 10.0 |

In other implementations, the collimating function of each laser collimator lens 1201 for each input laser beam and the converging function of the respective small converging lens 1101 can be combined into a single lens unit to eliminate the need for two separate lenses 1201 and 1210 for each input beam from each laser. For example, a single lens unit can be placed in front of each laser diode 1201 to replace the laser collimator lens 1210 and the respective lens 1210 in FIG. 12. This single lens unit can be identical for laser diodes 1201 when such laser diodes 1201 are placed at the same distance from the field lens 1020 (L2). Two single lens units for two laser diodes 1201 can be different when the two laser diodes 1201 are located at different distances from the field lens 1020 (L2) in order for, the lenses 1020 (L2) and 1030 (L3) to place the exit pupils of the different beams at a common plane, i.e., the galvo mirror 340.

In the lens array design with multiple tilted small lenses 1210 in FIG. 12, each small lens 1210 may be engaged to a lens actuator to be adjusted axially to do focus correction and laterally to tilt each laser beam incident to the field lens 1020 (L2). In an implementation where the laser collimator lens 1202 and the lens 1210 are combined into a single lens unit in front of each laser diode 1201, a lens actuator may also be used to adjust the single lens unit axially to control the beam focus and laterally to control the beam tilt.

TABLE 3

| Surf. No. | Description | Radius of Curvature [mm] | Thickness [mm] | Index of Refraction | Clear Aperture Diameter [mm] | Conic Constant |
|---|---|---|---|---|---|---|
| 1 | Entrance Pupil | n/a | 35.00 | | 10 | |
| 2 | Lens 1041 (L4) Surface 1 | −23.045 | 3.000 | 1.52972 | 32 | |
| 3 | Lens 1041 (L4) Surface 2 | −97.509 | 13.157 | | 39 | |
| 4 | Lens 1041 (L4) Surface 3 | −126.950 | 12.000 | 1.75165 | 55 | |
| 5 | Lens 1041 (L4) Surface 4 | −37.713 | 1.000 | | 57 | −.2398 |
| 6 | Lens 1041 (L4) Surface 5 | 122.452 | 10.000 | 1.75165 | 66 | |
| 7 | Lens 1041 (L4) Surface 6 | −1079.800 | 199.362 | | 66 | |
| 8 | Lens 1042 (L5) Surface 1 | 1079.800 | 10.000 | 1.75165 | 66 | |
| 9 | Lens 1042 (L5) Surface 2 | −122.452 | 1.000 | | 66 | |
| 10 | Lens 1042 (L5) Surface 3 | 37.713 | 12.000 | 1.75165 | 57 | −.2398 |
| 11 | Lens 1042 (L5) Surface 4 | 126.950 | 13.157 | | 55 | |
| 12 | Lens 1042 (L5) Surface 5 | 97.509 | 3.000 | 1.52972 | 39 | |
| 13 | Lens 1042 (L5) Surface 5 | 23.045 | 35.000 | | 33 | |
| 14 | Exit Pupil | n/a | | | 10 | |

Figure 13:
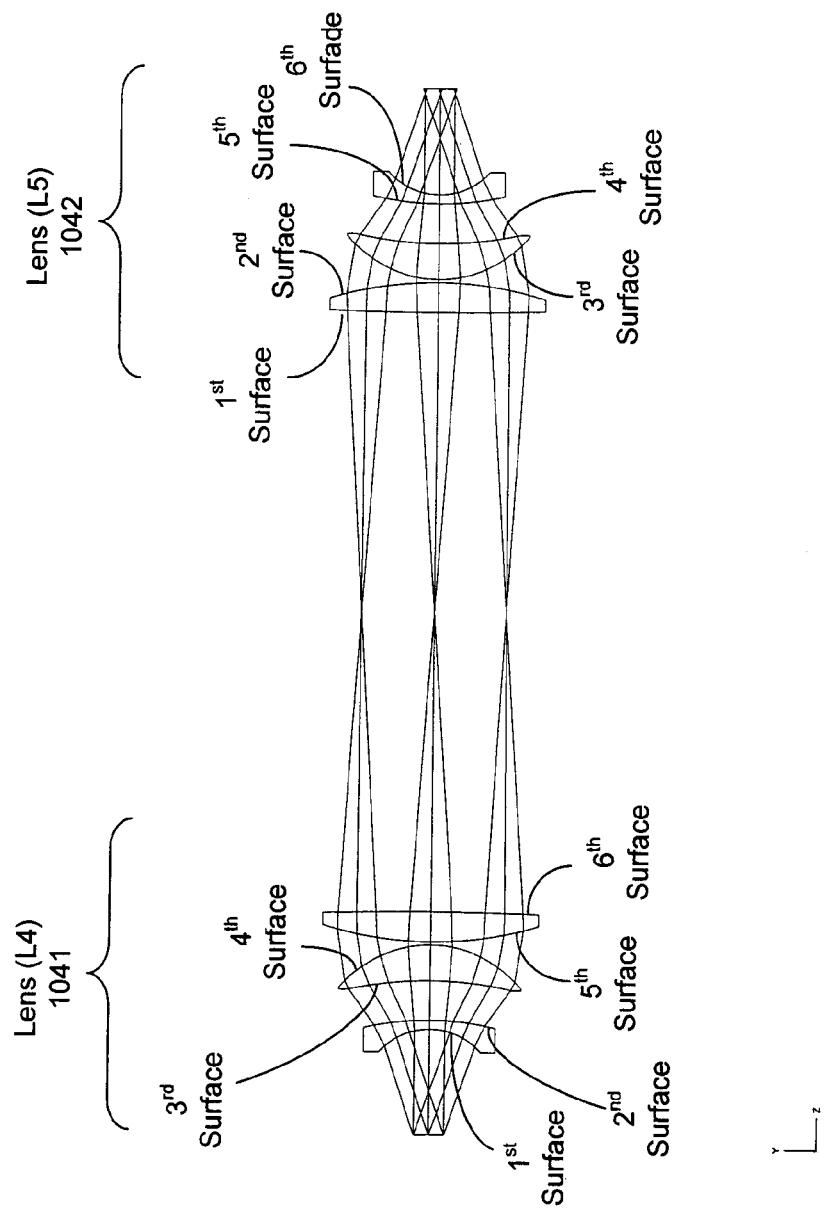
FIG. 13 shows an example of an afocal relay between a galvo mirror and a polygon scanner to image the galvo mirror on to a reflecting facet of the polygon scanner.

FIG. 13 further shows one specific example design for the 1:1 afocal relay 1002 shown in FIG. 10. In this example, the lens 1041 (L4) has three lenses with six lens surfaces and the lens 1042 (L5) also has three lenses with six lens surfaces. TABLE 3 lists exemplary lens parameters for the design.

Referring to FIGS. 3, 5A, 5B and 10, the scan lens 360, which may include more than one lens, can inherently have optical distortions that change with the incident angle and incident position of a scanning beam at the entrance of the scan lens 360. The scanning light is scanned along the horizontal direction by, e.g., a horizontal scanner such as a polygon scanner and along the vertical direction by, e.g., a vertical scanner such as a galvo mirror. The optical distortions in the scan lens 360 can cause beam positions on the screen 101 to trace a curved line rather than a straight horizontal scanned line. This is often referred to as a horizontal bow distortion. Similarly, the optical distortions in the scan lens 360 can cause beam positions on the screen 101, which ideally form a straight vertical line, to form a curved vertical line instead. This part of the optical distortions of the imaging lens assembly is also known as the vertical bow distortion.

Notably, the scan lens 360, even when implemented as a two-dimensional f-theta lens, can produce a distorted image due to the compound angle that is produced by the two mirror scanning in two orthogonal axes by the galvo mirror 340 and the polygon scanner 350. The distortions caused by the scan lens 360 are present along both the horizontal and vertical directions. Such distortions degrade the displayed image and thus are undesirable.

Figure 14:
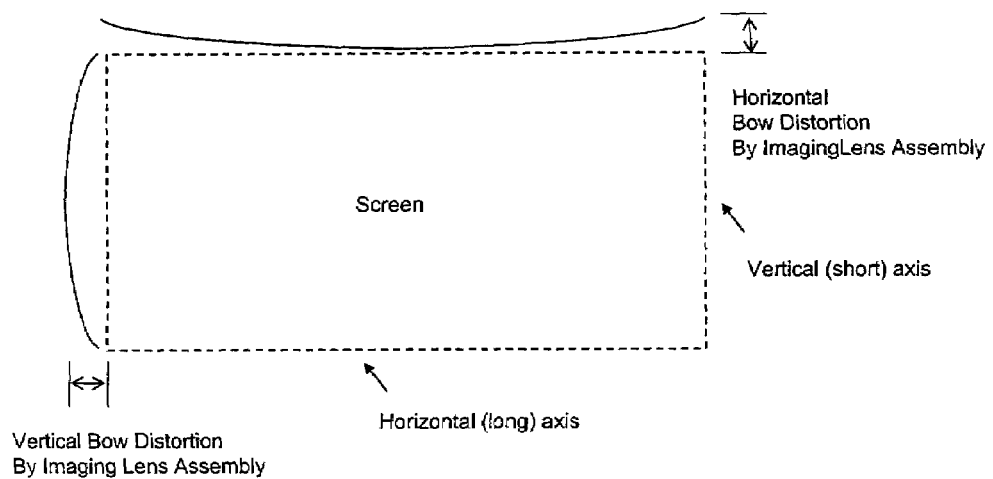
FIG. 14 illustrates bow distortions caused by a scan lens in a scanning display system based on the laser module in FIG. 3.

FIG. 14 illustrates an example of the vertical and horizontal bow distortions by a two-dimensional f-theta scan lens located in the optical path between the scanning optical module (e.g., the polygon 350 and galvo mirror 340) and the screen 101. As illustrated, the bow distortion in each direction increases from the center of the screen towards the edge of the screen as the incident angle of the light to the scan lens increases.

One approach to the bow distortion problem is to design the scan lens in a way that reduces the distortions within an acceptable range. This optical approach may require complex lens assembly configurations with multiple lens elements. The complex multiple lens elements can cause the final lens assembly to depart from desired f-theta conditions and thus can compromise the optical scanning performance. The number of lens elements in the assembly usually increases as the tolerance for the distortions decreases. Hence, a lens assembly with an acceptable bow distortion in both directions may include multiple lens elements with complex geometrical shapes. Because the bow distortions are in both directions, the lens elements must be shaped properly in both directions. Due to presence of multiple lenses and complex shape of each lens, such a scan lens with complex multiple lens elements can be expensive to fabricate.

Figure 15:
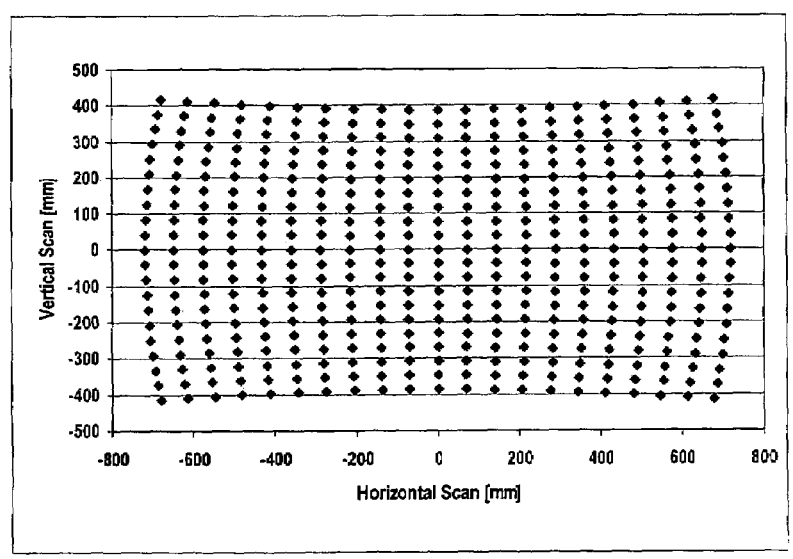
FIG. 15 shows an example of measured distortions on a screen caused by a scan lens in a scanning system based on the design in FIG. 3.

FIG. 15 shows an example map of measured image pixel positions on a fluorescent screen. The effects of the vertical and horizontal bow distortions caused by a scan lens assembly can be measured. The vertical and horizontal bow distortions of a given scan lens assembly is essentially fixed and can be measured.

In recognition of limitations in using a complex multi-lens design for the scan lens to reduce the bow distortions, a digital or electronic distortion correction technique is described below. According to this technique, the image signals modulated onto a scanning beam are digitally or electronically distorted based on measured bow distortions of the scan lens to negate the bow distortions of the scan lens when the image is displayed on the screen.

The digital correction of the vertical bow distortion of the scan lens can be achieved by controlling the timing of laser pulses in the scanning beam during each horizontal scan. This is because a horizontal location of a laser pulse on the screen 101 can be controlled by the timing of the laser pulse during each horizontal scan. A time delay in timing of a pulse can cause the corresponding position of the laser pulse on the screen to spatially shift downstream along the horizontal scan direction. Conversely, an advance in timing of a pulse can cause the corresponding position of the laser pulse on the screen to spatially shift upstream along the horizontal scan direction. A position of a laser pulse on the screen in the horizontal direction can be controlled electronically or digitally by controlling timing of optical pulses in the scanning beam. Notably, the vertical bow distortion can be treated as a shift in position of a pixel in the horizontal direction. Therefore, the timing of the pulses in the scanning beam can be controlled to direct each optical pulse to a location that reduces or offsets the horizontal displacement of the beam caused by the vertical bow distortion of the scan lens.

The horizontal bow distortion can be corrected with a different digital control. As illustrated by the example in FIG. 15, for a given scanning system, the image distortion map on the screen can be measured. The data for this measured image distortion map can be stored in a memory of the digital processor or scan engine of the signal modulation controller in the laser module 110. The digital processing can be programmed to use this measured image distortion map to compute the image warping. Incoming image data generated for an ideal and distortion-free scan lens is remapped based on the computed image warping into predistorted image data at different pixel locations from the original pixel locations so that, when the remapped image data is read out for display, the pixel brightness appears at the correct location on the screen. This remapping of image data on a pixel-by-pixel basis can be achieved by various image warping techniques, for example, by using a linear brightness interpolation between lines to produce minimal visual noise on the screen. Pixel remapping can be effective in correcting the horizontal bow distortion.

The above digital correction method essentially creates new image data for a distorted image on the screen that negates the optical distortions in the scanning system, including the distortions caused by the scan lens 360. The laser beams are then modulated with the modified image data to display images on the screen. Due to the built-in distortions in the modified image data, the optical distortions in the final image on the screen are eliminated or minimized.

Figure 16A:
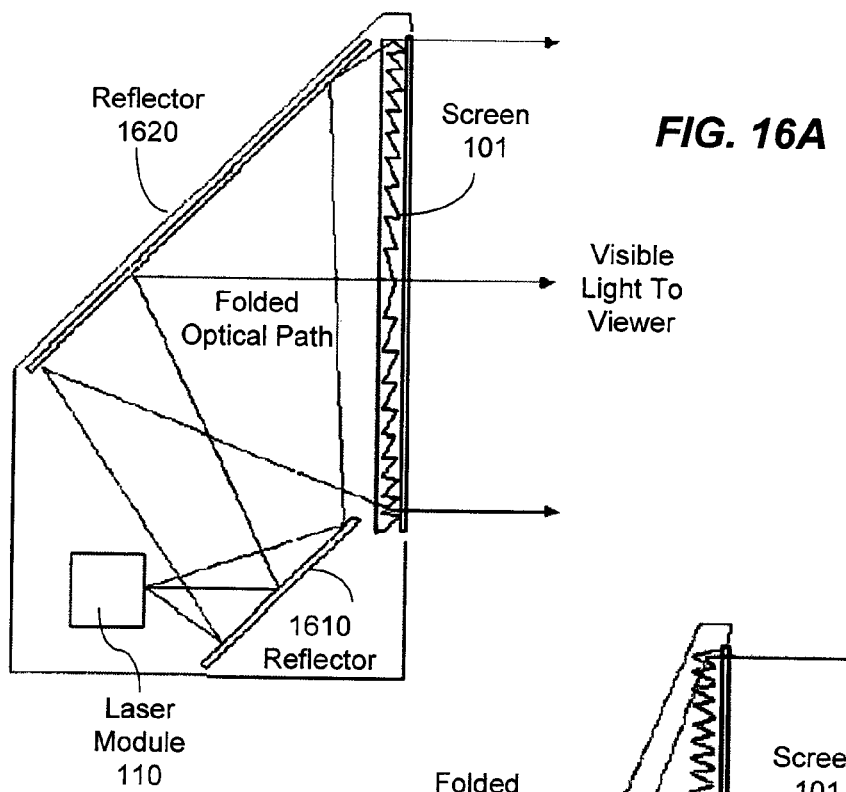
FIGS. 16A and 16B show two examples of folded optical paths for directing a scanning laser beam to a screen with phosphors in scanning beam rear projection systems.
Figure 16B:
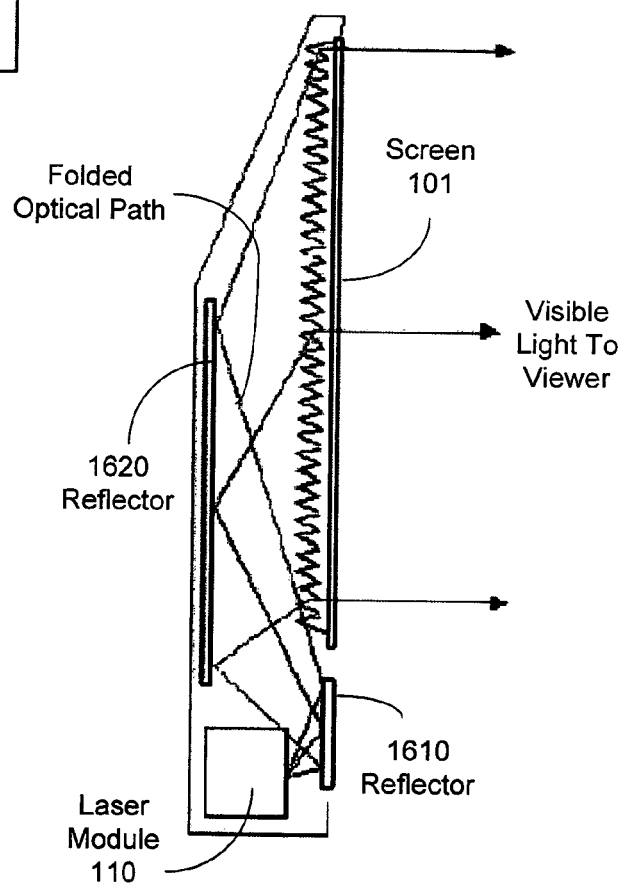

The scanning beam display systems based on FIGS. 3, 5A, 5B and 10 can be implemented using folded optical paths for directing scanning beams from the laser module 110 to the fluorescent screen 101 to reduce the physical spacing between the laser module 110 and the screen 101. FIGS. 16A and 16B show two folded optical designs that direct the output scanning laser beams from the laser module 110 to the fluorescent screen 101 in rear projection configurations. At least two reflectors 1610 and 1620 are used to direct the scanning beams along a folded optical path onto the screen 101. The reflectors 1610 and 1620 can be in various geometries and configurations. Such folded designs reduce the physical dimension of the scanning display systems. In one implementation, at least one of the reflectors 1610 and 1620 may have a curved surface to have a predetermined amount of optical power. For example, the optical power of the reflectors 1610 and 1620 can be selected in connection with the optical power of the scan lens 360 to reduce the optical path length from the scan lens 360 to the screen 101.

The scanning based display systems described in this application can use a telecentric type lens, such as a Fresnel lens, in front of the screen 101, to redirect the incident scanning excitation beam 120 to be at a normal to the screen 101. This feature can be used to enhance the brightness of the screen.

While the specification of this application contains many specifics, these should not be construed as limitations on the scope of any invention or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Only a few implementations are disclosed. However, it is understood that variations and enhancements may be made.

What is claimed is:
1. A display system, comprising:
a plurality of lasers forming a laser array to produce a plurality of laser beams, respectively;
a scanning module placed in an optical path of the laser beams to scan the laser beams in two orthogonal directions;
an afocal optical relay module placed between the lasers and the scanning module having a plurality of lenses to reduce a spacing between two adjacent laser beams of the laser array and to overlap the laser beams at the scanning module, wherein the afocal optical relay module comprises a plurality of first lenses, a second lens; and a third lens, wherein:
the plurality of first lenses have first focal lengths and are respectively placed in optical paths of the laser beams, each first lens receives a respective laser beam among the laser beams and focuses the respective laser beam, and each first lens refracts the respective laser beam such that the plurality of laser beams converge toward the second lens after the refraction;
the second lens has a second focal length shorter than the first focal lengths and is spaced from the first lenses by the first focal lengths to focus the laser beams from the first lenses; and
the third lens has a third focal length longer than the second focal length and is spaced from the second lens by the third focal length to focus and direct the laser beams from the second lens to the scanning module;
a screen;

a scan lens positioned to receive the laser beams from the scanning module and to project the laser beams onto the screen by imaging the lasers onto the screen; and a Fresnel lens placed in front of the screen to direct light from the scan lens into the screen at a normal incidence.

2. A display system, comprising:

a plurality of lasers forming a laser array to produce a plurality of laser beams, respectively;

a scanning module placed in an optical path of the laser beams to scan the laser beams in two orthogonal directions; and an afocal optical relay module placed between the lasers and the scanning module having a plurality of lenses to reduce a spacing between two adjacent laser beams of the laser array and to overlap the laser beams at the scanning module, wherein the afocal optical relay module comprises a plurality of first lenses, a second lens; and a third lens, wherein:

the plurality of first lenses have first focal lengths and are respectively placed in optical paths of the laser beams, each first lens receives a respective laser beam among the laser beams and focuses the respective laser beam, and each first lens refracts the respective laser beam such that the plurality of laser beams converge toward the second lens after the refraction;

the second lens has a second focal length shorter than the first focal lengths and is spaced from the first lenses by the first focal lengths to focus the laser beams from the first lenses; and the third lens has a third focal length longer than the second focal length and is spaced from the second lens by the third focal length to focus and direct the laser beams from the second lens to the scanning module;

a screen;

a scan lens positioned to receive the laser beams from the scanning module and to project the laser beams onto the screen by imaging the lasers onto the screen; and a signal modulation controller in communication with the lasers to supply image data to control the lasers which modulate the laser beams, respectively, to carry an image to be displayed on the screen, wherein the signal modulation controller has image data that contains image distortions which negate optical distortions of the scan lens when displayed on the screen.

3. A display system, comprising:

a plurality of lasers forming a laser array to produce a plurality of laser beams, respectively;

a scanning module placed in an optical path of the laser beams to scan the laser beams in two orthogonal directions; and an afocal optical relay module placed between the lasers and the scanning module having a plurality of lenses to reduce a spacing between two adjacent laser beams of the laser array and to overlap the laser beams at the scanning module, wherein the afocal optical relay module comprises a plurality of first lenses, a second lens; and a third lens, wherein:

the plurality of first lenses have first focal lengths and are respectively placed in optical paths of the laser beams, each first lens receives a respective laser beam among the laser beams and focuses the respective laser beam, and each first lens refracts the respective laser beam such that the plurality of laser beams converge toward the second lens after the refraction;

the second lens has a second focal length shorter than the first focal lengths and is spaced from the first lenses by the first focal lengths to focus the laser beams from the first lenses; and the third lens has a third focal length longer than the second focal length and is spaced from the second lens by the third focal length to focus and direct the laser beams from the second lens to the scanning module; and a plurality of laser actuators, each engaged to a respective laser and operable to adjust a direction of a respective laser beam produced by the respective laser, wherein each laser actuator rotates the direction of the respective layer beam produced by the respective laser around a pivot point on the scanning module.

4. The system as in claim 3, further comprising:

a screen; and a scan lens positioned to receive the laser beams from the scanning module and to project the laser beams onto the screen by imaging the lasers onto the screen.

5. The system as in claim 4, wherein the scan lens is a two-dimensional f-theta lens.

6. A display system, comprising:

a light source to produce a plurality of excitation beams modulated to carry images;

a scanning module to scan the plurality of excitation beams in two orthogonal directions;

an afocal optical relay module placed between the light source and the scanning module to reduce a spacing between two adjacent excitation beams of the plurality of excitation beams and to overlap the excitation beams at the scanning module, wherein the afocal optical relay module comprises a plurality of first lenses, a second lens, and a third lens, wherein:

the plurality of first lenses have first focal lengths and are respectively placed in optical paths of the excitation beams, each first lens receives a respective excitation beam among the excitation beams and focuses the respective excitation beam, and each first lens refracts the respective excitation beam such that the plurality of excitation beams converge toward the second lens after the refraction;

a second lens has a second focal length shorter than the first focal lengths and is spaced from the first lenses by the first focal lengths to focus the excitation beams from the first lenses; and a third lens has a third focal length longer than the second focal length and is spaced from the second lens by the third focal length to focus and direct the excitation beams from the second lens to the scanning module;

a fluorescent screen to receive the scanning excitation beams, the fluorescent screen emitting visible light to form the images with the emitted visible light when illuminated by the scanning excitation beams;

a two-dimensional f-theta scan lens positioned to receive the scanning excitation beams from the scanning module and to project the scanning excitation beams onto the fluorescent screen; and a signal modulation controller in communication with the light source to supply image data for the images to control the light source which modulates the excitation beams, wherein the signal modulation controller provides image data with image distortions which negate optical distortions of the two-dimensional f-theta scan lens when the images are displayed on the screen.

7. The system as in claim 1, 2, 3, or 6, wherein the scanning module comprises:
- a galvo mirror positioned to receive the laser beams from the third lens and scan the received laser beams along a first scanning direction, and
- a polygon scanner positioned to receive the laser beams from the galvo mirror and operable to scan the received laser beams along a second scanning direction orthogonal to the first scanning direction; and
- wherein the system further comprises an optical imaging lens module placed between the galvo mirror and the polygon scanner to image the galvo mirror onto the polygon scanner.

8. The system as in claim 7, wherein the optical imaging lens module comprises a first lens unit and a second lens unit to produce a unity image magnification.

9. The system as in claim 1, 2, 3, or 6, further comprising a plurality of lens actuators that are engaged to the first lenses, respectively, each lens actuator operable to adjust a respective first lens.

10. The system as in claim 1, 2, 3, or 6, further comprising:
- a laser array mounting rack to hold the plurality of lasers in a three dimensional array.

11. The system as in claim 10, wherein lasers in each subsidiary laser array are oriented to direct respective laser beams in a fan configuration converging towards the scanning module.

12. The system as in claim 1, 2, 3, or 6, further comprising:
- a laser array mounting rack to hold the plurality of lasers in a plurality of subsidiary laser arrays, where different subsidiary laser arrays are spatially shifted from one another to have different distances to the scanning module.

13. The system as in claim 4, 1, or 2, wherein the screen comprises fluorescent materials that emit visible light to form images with the emitted visible light when illuminated by the laser beams.

14. The system as in claim 4, 1, or 2, further comprising:
- first and second optical reflectors that reflect the laser beams, wherein the first optical reflector is positioned to reflect scanning laser beams from the scan lens to the second optical reflector which is positioned to reflect the scanning laser beams from the first optical reflector to the screen,
- wherein the first and second optical reflectors are positioned to fold a respective optical path from the scan lens to the screen to reduce a distance between the scan lens and the screen.

15. The system as in claim 1, 2, or 6, further comprising a plurality of laser actuators, each engaged to a respective laser of the plurality of lasers and operable to adjust a direction of a respective laser beam produced by the laser.

* * * * *

UNITED STATES PATENT AND TRADEMARK OFFICE
CERTIFICATE OF CORRECTION

PATENT NO. : 8,089,425 B2
APPLICATION NO. : 11/510495
DATED : January 3, 2012
INVENTOR(S) : Phillip H. Malyak Page 1 of 1

It is certified that error appears in the above-identified patent and that said Letters Patent is hereby corrected as shown below:

Column 18, line 49 (claim 1, line 12), after "lens" change the ";" to a --,--.

Column 19, line 18 (claim 2, line 23), after "lens" change the ";" to a --,--.

Column 19, line 59 (claim 3, line 13), after "lens" change the ";" to a --,--.

Column 20, line 14 (claim 3, line 34), change "layer beam" to --laser beam--.

Signed and Sealed this
Twenty-seventh Day of March, 2012

David J. Kappos
*Director of the United States Patent and Trademark Office*